United States Patent
Cui et al.

(10) Patent No.: US 12,363,447 B2
(45) Date of Patent: Jul. 15, 2025

(54) VIDEO PROCESSING METHOD AND APPARATUS

(71) Applicant: HONOR DEVICE CO., LTD., Guangdong (CN)

(72) Inventors: Hantao Cui, Shenzhen (CN); Dong Zhang, Shenzhen (CN); Pengpeng Zhang, Shenzhen (CN); Yan Mo, Shenzhen (CN); Chenqing Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/558,829

(22) PCT Filed: Jan. 10, 2023

(86) PCT No.: PCT/CN2023/071669
§ 371 (c)(1),
(2) Date: Nov. 3, 2023

(87) PCT Pub. No.: WO2023/160295
PCT Pub. Date: Aug. 31, 2023

(65) Prior Publication Data
US 2024/0223911 A1    Jul. 4, 2024

(30) Foreign Application Priority Data
Feb. 28, 2022  (CN) .................. 202210193750.X

(51) Int. Cl.
*H04N 23/74*    (2023.01)
*H04N 5/262*    (2006.01)
(Continued)

(52) U.S. Cl.
CPC ......... *H04N 23/741* (2023.01); *H04N 5/2621* (2013.01); *H04N 23/632* (2023.01);
(Continued)

(58) Field of Classification Search
CPC .... H04N 23/741; H04N 23/667; H04N 23/76; H04N 23/80; H04N 23/71; H04N 23/632; H04N 5/2621
See application file for complete search history.

(56) References Cited

U.S. PATENT DOCUMENTS 8,730,523 B2    5/2014  Takemura
10,241,283 B1 *  3/2019  Shen .................. H04B 10/2589
(Continued)

FOREIGN PATENT DOCUMENTS

CA    2986520 A1    5/2019
CN   102253815 A   11/2011
(Continued)

OTHER PUBLICATIONS

Yang Tong et al.;"Visual perception based rate distortion optimization method for high dynamic range video coding"; Opto-Electronic Engineering; Dec. 31, 2018;11pages(with English abstract).
(Continued)

*Primary Examiner* — Mishawn N. Hunter
(74) *Attorney, Agent, or Firm* — WOMBLE BOND DICKINSON (US) LLP

(57) ABSTRACT

Embodiments of this application provide a video processing method and apparatus. The method includes: receiving, by a first device, an operation of enabling photographing in a movie mode, where obtaining, by the first device, a first image sequence based on a camera in response to the operation of enabling photographing; performing, by the first device, encoding based on the first image sequence and first dynamic metadata corresponding to the first brightness scene, to obtain a first HDR video; obtaining, by a second device, the first HDR video from the first device; adjusting, by the second device, a brightness of the first HDR video
(Continued)

based on a preset brightness, to obtain a second HDR video; and playing, by the second device, the second HDR video.

19 Claims, 24 Drawing Sheets

(51) Int. Cl.
  *H04N 23/63* (2023.01)
  *H04N 23/667* (2023.01)
  *H04N 23/71* (2023.01)
  *H04N 23/741* (2023.01)
  *H04N 23/76* (2023.01)
  *H04N 23/80* (2023.01)

(52) U.S. Cl.
  CPC ........... *H04N 23/667* (2023.01); *H04N 23/71* (2023.01); *H04N 23/76* (2023.01); *H04N 23/80* (2023.01)

(56) References Cited

U.S. PATENT DOCUMENTS

| | | | |
|---|---|---|---|
| 10,477,141 B1* | 11/2019 | Huang | H04N 21/435 |
| 10,880,557 B2* | 12/2020 | Dai | H04N 19/186 |
| 10,957,024 B2* | 3/2021 | Mandal | G06T 5/92 |
| 10,992,877 B2 | 4/2021 | Yamamoto et al. | |
| 11,183,147 B2* | 11/2021 | Shintani | H04N 21/23424 |
| 11,317,071 B2 | 4/2022 | Wang et al. | |
| 11,388,447 B2 | 7/2022 | Andrivon et al. | |
| 11,445,219 B2 | 9/2022 | Talstra et al. | |
| 11,483,616 B2 | 10/2022 | Uchimura | |
| 11,800,221 B2 | 10/2023 | Yang et al. | |
| 2019/0156468 A1 | 5/2019 | Olivier et al. | |
| 2020/0394774 A1 | 12/2020 | Andrivon et al. | |
| 2021/0084257 A1 | 3/2021 | Yuan et al. | |
| 2021/0183028 A1 | 6/2021 | Cellier et al. | |
| 2021/0266608 A1* | 8/2021 | Adrivon | H04N 19/98 |
| 2023/0049334 A1 | 2/2023 | Chen et al. | |

FOREIGN PATENT DOCUMENTS

| | | |
|---|---|---|
| CN | 108495053 A | 9/2018 |
| CN | 111095918 A | 5/2020 |
| CN | 111771375 A | 10/2020 |
| CN | 112272947 A | 1/2021 |
| CN | 112400324 A | 2/2021 |
| CN | 112532857 A | 3/2021 |
| CN | 113630563 A | 11/2021 |
| CN | 113810596 A | 12/2021 |
| CN | 113810602 A | 12/2021 |
| CN | 113824914 A | 12/2021 |
| CN | 115564659 A | 1/2023 |
| EP | 3694216 A1 | 8/2020 |
| JP | 2019213144 A | 12/2019 |
| JP | 2020077964 A | 5/2020 |
| WO | 2021223540 A1 | 11/2021 |

OTHER PUBLICATIONS

Mohammadi Pedram et al.;"A Perception-Based Inverse Tone Mapping Operator for High Dynamic Range Video Applications"; IEEE Transactions on Circuits and Systems for Video Technology; Aug. 6, 2020; 13pages.

* cited by examiner

VIDEO PROCESSING METHOD AND APPARATUS

CROSS-REFERENCE TO RELATED APPLICATIONS

This application is a national stage of International Application No. PCT/CN2023/071669, filed on Jan. 10, 2023, which claims priority to Chinese Patent Application No. 202210193750.X, filed on Feb. 28, 2022. The disclosures of both of the aforementioned applications are hereby incorporated by reference in their entireties.

TECHNICAL FIELD

This application relates to the technical field of terminals, and in particular, to a video processing method and apparatus.

BACKGROUND

With the popularization and development of the Internet, people's demands for functions of terminal devices are becoming diversified. For example, a user may use a movie mode in a camera application of a terminal device to record a high dynamic range (High Dynamic Range, HDR) video.

Generally, the terminal device may obtain the HDR video through processing of a plurality of frames of images obtained based on a camera. The HDR video may be configured based on static metadata. For example, a conversion curve, that is, a perceptual quantization (perceptual quantization PQ) curve of the HDR is fixedly mapped based on an absolute brightness. The absolute brightness, for example, may be a reference display brightness of a display of the terminal device, for example, 1000 nits (nit).

However, when the HDR video is displayed on a device with a peak brightness less than 1000 nits, a loss of highly bright information is caused, which affects a display effect of the HDR video.

SUMMARY

Embodiments of this application provide a video processing method and apparatus. A first device may match different dynamic metadata for different brightness scenes corresponding to a plurality of frames of images obtained based on a camera, adjust the plurality of frames of images by using the different dynamic metadata, to obtain an HDR video, and send the HDR video to a second device, so that the second device may perform brightness mapping on the HDR video based on a preset brightness of the HDR video, and display a video content with an appropriate brightness.

In a first aspect, an embodiment of this application provides a video processing method, which is applicable to a video processing system. The video processing system includes a first device and a second device. The method includes: receiving, by the first device, an operation of enabling photographing in a movie mode, where the movie mode is a mode for recording a high dynamic range HDR video; obtaining, by the first device, a first image sequence based on a camera in response to the operation of enabling photographing, where the first image sequence corresponds to a first brightness scene; performing, by the first device, encoding based on the first image sequence and first dynamic metadata corresponding to the first brightness scene, to obtain a first HDR video, where the first dynamic metadata includes a preset brightness; obtaining, by a second device, the first HDR video from the first device; adjusting, by the second device, a brightness of the first HDR video based on a preset brightness, to obtain a second HDR video; and playing, by the second device, the second HDR video. In this way, the first device may match different dynamic metadata for different brightness scenes corresponding to a plurality of frames of images obtained based on a camera, adjust the plurality of frames of images by using the different dynamic metadata, to obtain an HDR video, and send the HDR video to the second device, so that the second device may perform brightness mapping on the HDR video based on the preset brightness of the HDR video, and display a video content with an appropriate brightness.

In a possible implementation, the adjusting, by the second device, a brightness of the first HDR video based on the preset brightness, to obtain a second HDR video includes: determining, by the second device, a brightness ratio, where the brightness ratio is a ratio between a peak brightness of the second device and the preset brightness; and adjusting, by the second device, the brightness of the first HDR video based on the brightness ratio, to obtain the second HDR video. In this way, the second device may further adjust the brightness of the first HDR video based on the peak brightness hardware of the second device may support, so that the adjusted second HDR video has a better display effect after the adjustment.

In a possible implementation, the method further includes: further obtaining, by the first device, a second image sequence based on the camera, where the second image sequence corresponds to a second brightness scene, and the first brightness scene is different from the second brightness scene. The performing, by the first device, encoding based on the first image sequence and first dynamic metadata corresponding to the first brightness scene, to obtain a first HDR video includes: performing, by the first device, encoding based on the first image sequence, the second image sequence, the first dynamic metadata corresponding to the first brightness scene, and second dynamic metadata corresponding to the second brightness scene, to obtain the first HDR video. In this way, the first device may match dynamic metadata corresponding to different brightness scenes, and perform encoding to obtain the HDR video based on different dynamic metadata.

In a possible implementation, before the performing, by the first device, encoding based on the first image sequence and first dynamic metadata corresponding to the first brightness scene, to obtain a first HDR video, the method further includes: performing, by the first device, image preprocessing on the first image sequence, to obtain a first image sequence after the image preprocessing; performing, by the first device, gamma correction processing on the first image sequence after the image preprocessing, to obtain a first image sequence after the gamma correction processing; performing, by the first device, 3D look up table processing on the first image sequence after the gamma correction processing, to obtain a first image sequence after the 3D look up table processing, where the first image sequence after the 3D look up table processing includes first static metadata corresponding to the first image sequence. The performing, by the first device, encoding based on the first image sequence and first dynamic metadata corresponding to the first brightness scene, to obtain a first HDR video includes: performing, by the first device, encoding based on the first image sequence after the 3D look up table processing and the first dynamic metadata corresponding to the first brightness scene, to obtain the first HDR video. In this way, the first device may obtain the HDR video with a relatively good picture effect based on image preprocessing and image post-processing of the first image sequence.

In a possible implementation, the first HDR video includes the first static metadata and the first dynamic metadata.

In a possible implementation, the method further includes: decoding, by the second device, the second HDR video into the first image sequence and the first static metadata when it is determined that the second device supports processing of the first static metadata; and performing, by the second device, encoding based on the first image sequence and the first static metadata, to obtain a third HDR video, where the second HDR video is different from the third HDR video. In this way, the second device may support both the dynamic metadata and the static metadata, and a second device that does not support processing of the dynamic metadata may generate the HDR video based on the static metadata.

In a possible implementation, a type of the first HDR video is an HDR10+ video, a type of the second HDR video is the HDR10+ video, and a type of the third HDR video is an HDR10 video.

In a possible implementation, the receiving, by the first device, an operation of enabling photographing in a movie mode includes: receiving, by the first device, an operation of enabling the movie mode; displaying, by the first device, a first interface in response to the operation of enabling the movie mode, where the first interface includes a control for recording the HDR video and a control for enabling photographing; receiving, by the first device, an operation of enabling the control for recording the HDR video when the control for recording the HDR video is in a disabled state; displaying, by the first device, a second interface in response to the operation for the control for recording the HDR video, where the second interface includes prompt information indicating that a 4K HDR10+ mode is enabled; and receiving, by the first device, an operation for the control for enabling photographing when the control for recording the HDR video is in an enabled state. In this way, the first device may determine whether a 4K HDR video needs to be recorded based on a flexible operation performed by a user on the control for recording the HDR video.

In a possible implementation, the method further includes: receiving, by the first device, an operation of disabling the control for recording the HDR video when the control for recording the HDR video is in the enabled state; and displaying, by the first device, a third interface in response to the operation for the control for recording the HDR video, where the third interface includes prompt information indicating that the 4K HDR10+ mode is disabled. In this way, the first device may determine whether the 4K HDR10+ mode is currently enabled based on the prompt information, thereby improving user experience for using a video recording function.

In a possible implementation, the method further includes: receiving, by the first device, an operation of enabling the movie mode for a first time; and displaying, by the first device, a fourth interface in response to the operation of enabling the movie mode for the first time, where the fourth interface includes the control for recording the HDR video and prompt information indicating that a 4K HDR10+ video is recorded after the control for recording the HDR video is enabled. In this way, when the user enables the movie mode for the first time, the user may determine how to enable the 4K HDR10+ mode based on guidance of the prompt information, thereby improving the user experience for using the video recording function.

In a possible implementation, the receiving, by the first device, an operation of enabling photographing in a movie mode includes: receiving, by the first device, an operation of enabling the movie mode; displaying, by the first device, a fifth interface in response to the operation of enabling the movie mode, where the fifth interface includes a control for viewing settings corresponding to a first application and a control for enabling photographing; receiving, by the first device, an operation for the control for viewing the settings corresponding to the first application; displaying, by the first device, a sixth interface in response to the operation for the control for viewing the settings corresponding to the first application, where the sixth interface includes a first control for recording a video with a 10-bit HDR in the movie mode and switching the video to 4K; and receiving, by the first device, the operation for the control for enabling photographing when the first control is in an enabled state. In this way, the user may flexibly control a movie HDR function control in function settings based on a photographing demand, thereby implementing recording of the HDR10+ video. The first application may be a camera application.

In a possible implementation, the method further includes: receiving, by the first device, an operation for a control for viewing function details in the first application; and displaying, by the first device, a seventh interface in response to the operation for the control for viewing the function details in the first application, where the seventh interface includes function details corresponding to the movie mode, and the function details corresponding to the movie mode indicate that a 4K HDR10+ video is allowed to be recorded in the movie mode. In this way, the user may learn various functions in the camera application based on the function details corresponding to the movie mode, thereby improving user experience of the camera application.

In a possible implementation, the method further includes: receiving, by the first device, an operation of enabling a second application; displaying, by the first device, an eighth interface in response to the operation of enabling the second application, where the eighth interface includes the first HDR video and an identifier corresponding to the first HDR video, and the identifier indicates a type of the first HDR video; receiving, by the first device, an operation for the first HDR video; and displaying, by the first device, a ninth interface in response to the operation for the first HDR video, where the ninth interface includes the identifier. In this way, the user may accurately find the HDR10+ video in a photos application based on the identifier, thereby improving convenience of viewing the HDR10+ video by the user. The second application may be a photos application.

In a possible implementation, after the obtaining, by the second device, the first HDR video from the first device, the method further includes: displaying, by the second device, a tenth interface, where the tenth interface includes prompt information indicating that the first HDR video is an HDR10+ video including dynamic metadata, a control for allowing receiving of the first HDR video, and a control for rejecting receiving of the first HDR video; receiving, by the second device, an operation for the control for allowing receiving of the first HDR video; and displaying, by the second device, an eleventh interface in response to the operation for the control for allowing receiving of the first HDR video, where the eleventh interface includes prompt information indicating to display the first HDR video based on the dynamic metadata. In this way, the second device may implement decoding and playback of the HDR10+ video sent by the first device.

In a second aspect, an embodiment of this application provides a video processing method, which is applicable to a first device. The method includes: receiving, by the first device, an operation of enabling photographing in a movie mode, where the movie mode is a mode for recording a high dynamic range HDR video; obtaining, by the first device, a first image sequence based on a camera in response to the operation of enabling photographing, where the first image sequence corresponds to a first brightness scene; performing, by the first device, encoding based on the first image sequence and first dynamic metadata corresponding to the first brightness scene, to obtain a first HDR video, where the first dynamic metadata includes a preset brightness; and sending, by the first device, the first HDR video to a second device. In this way, the first device may match different dynamic metadata for different brightness scenes corresponding to a plurality of frames of images obtained based on a camera, and adjust the plurality of frames of images by using the different dynamic metadata, to obtain an HDR video.

In a possible implementation, the method further includes: further obtaining, by the first device, a second image sequence based on the camera, where the second image sequence corresponds to a second brightness scene, and the first brightness scene is different from the second brightness scene. The performing, by the first device, encoding based on the first image sequence and first dynamic metadata corresponding to the first brightness scene, to obtain a first HDR video includes: performing, by the first device, encoding based on the first image sequence, the second image sequence, the first dynamic metadata corresponding to the first brightness scene, and second dynamic metadata corresponding to the second brightness scene, to obtain the first HDR video. In this way, the first device may match dynamic metadata corresponding to different brightness scenes, and perform encoding to obtain the HDR video based on different dynamic metadata.

In a possible implementation, before the performing, by the first device, encoding based on the first image sequence and first dynamic metadata corresponding to the first brightness scene, to obtain a first HDR video, the method further includes: performing, by the first device, image preprocessing on the first image sequence, to obtain a first image sequence after the image preprocessing; performing, by the first device, gamma correction processing on the first image sequence after the image preprocessing, to obtain a first image sequence after the gamma correction processing; performing, by the first device, 3D look up table processing on the first image sequence after the gamma correction processing, to obtain a first image sequence after the 3D look up table processing, where the first image sequence after the 3D look up table processing includes first static metadata corresponding to the first image sequence. The performing, by the first device, encoding based on the first image sequence and first dynamic metadata corresponding to the first brightness scene, to obtain a first HDR video includes: performing, by the first device, encoding based on the first image sequence after the 3D look up table processing and the first dynamic metadata corresponding to the first brightness scene, to obtain the first HDR video. In this way, the first device may obtain the HDR video with a relatively good picture effect based on image preprocessing and image post-processing of the first image sequence.

In a possible implementation, the first HDR video includes first static metadata and the first dynamic metadata.

In a third aspect, an embodiment of this application provides a video processing method, which is applicable to a second device. The method includes: obtaining, by the second device, a first HDR video from a first device, where the first HDR video includes first dynamic metadata and a first image sequence, and the first dynamic metadata includes a preset brightness; adjusting, by the second device, a brightness of the first HDR video based on the preset brightness, to obtain a second HDR video; and playing, by the second device, the second HDR video. In this way, the second device may receive an HDR video from the first device and perform brightness mapping on the HDR video based on the preset brightness, thereby displaying a video content with an appropriate brightness.

In a possible implementation, the adjusting, by the second device, a brightness of the first HDR video based on the preset brightness, to obtain a second HDR video includes: determining, by the second device, a brightness ratio, where the brightness ratio is a ratio between a peak brightness of the second device and the preset brightness; and adjusting, by the second device, the brightness of the first HDR video based on the brightness ratio, to obtain the second HDR video. In this way, the second device may further adjust the brightness of the first HDR video based on the peak brightness hardware of the second device may support, so that the adjusted second HDR video has a better display effect after the adjustment.

In a possible implementation, the first HDR video includes first static metadata and the first dynamic metadata.

In a possible implementation, the method further includes: decoding, by the second device, the second HDR video into the first image sequence and the first static metadata when it is determined that the second device supports processing of the first static metadata; and performing, by the second device, encoding based on the first image sequence and the first static metadata, to obtain a third HDR video, where the second HDR video is different from the third HDR video. In this way, the second device may further adjust the brightness of the first HDR video based on the peak brightness hardware of the second device may support, so that the adjusted second HDR video has a better display effect after the adjustment.

In a possible implementation, a type of the first HDR video is an HDR10+ video, a type of the second HDR video is the HDR10+ video, and a type of the third HDR video is an HDR10 video.

In a fourth aspect, an embodiment of this application further provides a video processing apparatus. The method includes a processing unit of a first device, a communication unit of a second device, and a processing unit of the second device. The processing unit of the first device is configured to receive an operation of enabling photographing in a movie mode, where the movie mode is a mode for recording a high dynamic range HDR video. The processing unit of the first device is configured to obtain a first image sequence based on a camera in response to the operation of enabling photographing, where the first image sequence corresponds to a first brightness scene. The processing unit of the first device is configured to perform encoding based on the first image sequence and first dynamic metadata corresponding to the first brightness scene, to obtain a first HDR video, where the first dynamic metadata includes a preset brightness. The communication unit of the second device is configured to obtain a first HDR video from a first device. The processing unit of the first device is configured to adjust a brightness of the first HDR video based on the preset brightness, to obtain a second HDR video. The processing unit of the second device is configured to play the second HDR video.

In a possible implementation, the processing unit of the second device is specifically configured to determine a brightness ratio, where the brightness ratio is a ratio between a peak brightness of the second device and the preset brightness. The processing unit of the second device is specifically configured to adjust the brightness of the first HDR video based on the brightness ratio, to obtain the second HDR video.

In a possible implementation, the processing unit of the first device is further configured to further obtain a second image sequence based on the camera, where the second image sequence corresponds to a second brightness scene, and the first brightness scene is different from the second brightness scene. The processing unit of the first device is further configured to perform encoding based on the first image sequence, the second image sequence, the first dynamic metadata corresponding to the first brightness scene, and second dynamic metadata corresponding to the second brightness scene, to obtain the first HDR video.

In a possible implementation, the processing unit of the first device is further configured to: perform image preprocessing on the first image sequence, to obtain a first image sequence after the image preprocessing; perform gamma correction processing on the first image sequence after the image preprocessing, to obtain a first image sequence after the gamma correction processing; perform 3D look up table processing on the first image sequence after the gamma correction processing, to obtain a first image sequence after the 3D look up table processing, where the first image sequence after the 3D look up table processing includes first static metadata corresponding to the first image sequence; and perform encoding based on the first image sequence after the 3D look up table processing and the first dynamic metadata corresponding to the first brightness scene, to obtain the first HDR video.

In a possible implementation, the first HDR video includes the first static metadata and the first dynamic metadata.

In a possible implementation, the processing unit of the second device is further configured to decode the second HDR video into the first image sequence and the first static metadata when it is determined that the second device supports processing of the first static metadata. The processing unit of the second device is further configured to perform encoding based on the first image sequence and the first static metadata, to obtain a third HDR video, where the second HDR video is different from the third HDR video.

In a possible implementation, a type of the first HDR video is an HDR10+ video, a type of the second HDR video is the HDR10+ video, and a type of the third HDR video is an HDR10 video.

In a possible implementation, the processing unit of the first device is specifically configured to receive an operation of enabling the movie mode. A display unit of the first device is specifically configured to display a first interface in response to the operation of enabling the movie mode, where the first interface includes a control for recording the HDR video and a control for enabling photographing. The processing unit of the first device is further specifically configured to receive an operation of enabling the control for recording the HDR video when the control for recording the HDR video is in a disabled state. The display unit of the first device is further specifically configured to display a second interface in response to the operation for the control for recording the HDR video, where the second interface includes prompt information indicating that a 4K HDR10+ mode is enabled. The processing unit of the first device is specifically configured to receive an operation for the control for enabling photographing when the control for recording the HDR video is in an enabled state.

In a possible implementation, the processing unit of the first device is further configured to receive an operation of disabling the control for recording the HDR video when the control for recording the HDR video is in the enabled state. The display unit of the first device is further configured to display a third interface in response to the operation for the control for recording the HDR video, where the third interface includes prompt information indicating that the 4K HDR10+ mode is disabled.

In a possible implementation, the processing unit of the first device is further configured to receive an operation of enabling the movie mode for a first time. The display unit of the first device is further configured to display a fourth interface in response to the operation of enabling the movie mode for the first time, where the fourth interface includes the control for recording the HDR video and prompt information indicating that a 4K HDR10+ video is recorded after the control for recording the HDR video is enabled.

In a possible implementation, the processing unit of the first device is specifically configured to receive an operation of enabling the movie mode. The display unit of the first device is specifically configured to display a fifth interface in response to the operation of enabling the movie mode, where the fifth interface includes a control for viewing settings corresponding to a first application and a control for enabling photographing. The processing unit of the first device is further specifically configured to receive an operation for the control for viewing the settings corresponding to the first application. The display unit of the first device is further specifically configured to display a sixth interface in response to the operation for the control for viewing the settings corresponding to the first application, where the sixth interface includes a first control for recording a video with a 10-bit HDR in the movie mode and switching the video to 4K. The processing unit of the first device is further specifically configured to receive the operation for the control for enabling photographing when the first control is in an enabled state.

In a possible implementation, the processing unit of the first device is further configured to receive an operation for a control for viewing function details in the first application. The display unit of the first device is further configured to display a seventh interface in response to the operation for the control for viewing the function details in the first application, where the seventh interface includes function details corresponding to the movie mode, and the function details corresponding to the movie mode indicate that a 4K HDR10+ video is allowed to be recorded in the movie mode.

In a possible implementation, the processing unit of the first device is further configured to receive an operation of enabling a second application. The display unit of the first device is further configured to display an eighth interface in response to the operation of enabling the second application, where the eighth interface includes the first HDR video and an identifier corresponding to the first HDR video, and the identifier indicates a type of the first HDR video. The processing unit of the first device is further configured to receive an operation for the first HDR video. The display unit of the first device is further configured to display a ninth interface in response to the operation for the first HDR video, where the ninth interface includes the identifier.

In a possible implementation, a display unit of the second device is further configured to display a tenth interface, where the tenth interface includes prompt information indicating that the first HDR video is an HDR10+ video including dynamic metadata, a control for allowing receiving of the first HDR video, and a control for rejecting receiving of the first HDR video. The processing unit of the second device is further configured to receive an operation for the control for allowing receiving of the first HDR video. The processing unit of the second device is further configured to display an eleventh interface in response to the operation for the control for allowing receiving of the first HDR video, where the eleventh interface includes prompt information indicating to display the first HDR video based on the dynamic metadata.

In a fifth aspect, an embodiment of this application provides a video processing apparatus, which includes a processing unit and a communication unit. The processing unit is configured to receive an operation of enabling photographing in a movie mode, where the movie mode is a mode for recording a high dynamic range HDR video. The processing unit is further configured to obtain a first image sequence based on a camera in response to the operation of enabling photographing, where the first image sequence corresponds to a first brightness scene. The processing unit is further configured to perform encoding based on the first image sequence and first dynamic metadata corresponding to the first brightness scene, to obtain a first HDR video, where the first dynamic metadata includes a preset brightness. The communication unit is further configured to send the first HDR video to a second device.

In a possible implementation, the processing unit is further configured to further obtain a second image sequence based on the camera, where the second image sequence corresponds to a second brightness scene, and the first brightness scene is different from the second brightness scene. The processing unit is further configured to perform encoding based on the first image sequence, the second image sequence, the first dynamic metadata corresponding to the first brightness scene, and second dynamic metadata corresponding to the second brightness scene, to obtain the first HDR video.

In a possible implementation, the processing unit is further specifically configured to: perform image preprocessing on the first image sequence, to obtain a first image sequence after the image preprocessing; perform gamma correction processing on the first image sequence after the image preprocessing, to obtain a first image sequence after the gamma correction processing; perform 3D look up table processing on the first image sequence after the gamma correction processing, to obtain a first image sequence after the 3D look up table processing, where the first image sequence after the 3D look up table processing includes first static metadata corresponding to the first image sequence; and perform encoding based on the first image sequence after the 3D look up table processing and the first dynamic metadata corresponding to the first brightness scene, to obtain the first HDR video.

In a possible implementation, the first HDR video includes first static metadata and the first dynamic metadata.

In a sixth aspect, an embodiment of this application provides a video processing apparatus, which includes a communication unit and a processing unit. The communication unit is configured to obtain a first HDR video from a first device, where the first HDR video includes first dynamic metadata and a first image sequence, and the first dynamic metadata includes a preset brightness. The processing unit is configured to adjust a brightness of the first HDR video based on the preset brightness, to obtain a second HDR video. The processing unit is further configured to play the second HDR video.

In a possible implementation, the processing unit is specifically configured to determine a brightness ratio for a second device, where the brightness ratio is a ratio between a peak brightness of the second device and the preset brightness. The processing unit is further specifically configured to adjust the brightness of the first HDR video based on the brightness ratio, to obtain the second HDR video.

In a possible implementation, the first HDR video includes first static metadata and the first dynamic metadata.

In a possible implementation, the processing unit is further configured to decode the second HDR video into the first image sequence and the first static metadata when it is determined that the second device supports processing of the first static metadata. The processing unit is further configured to perform encoding based on the first image sequence and the first static metadata, to obtain a third HDR video, where the second HDR video is different from the third HDR video.

In a possible implementation, a type of the first HDR video is an HDR10+ video, a type of the second HDR video is the HDR10+ video, and a type of the third HDR video is an HDR10 video.

In a seventh aspect, an embodiment of this application provides a video processing apparatus, which includes a processor and a memory. The memory is configured to store code instructions. The processor is configured to execute the code instructions, to cause a terminal device to perform the video processing method described in the first aspect or any implementation of the first aspect, or perform the video processing method described in the second aspect or any implementation of the second aspect, or perform the video processing method described in the third aspect or any implementation of the third aspect.

In an eighth aspect, an embodiment of this application provides a computer-readable storage medium, which stores instructions. The instructions, when executed, cause a computer to perform the video processing method described in the first aspect or any implementation of the first aspect, or perform the video processing method described in the second aspect or any implementation of the second aspect, or perform the video processing method described in the third aspect or any implementation of the third aspect.

In a ninth aspect, a computer program product includes a computer program. The computer program, when run, causes a computer to perform the video processing method described in the first aspect or any implementation of the first aspect, or perform the video processing method described in the second aspect or any implementation of the second aspect, or perform the video processing method described in the third aspect or any implementation of the third aspect.

It should be understood that the fourth aspect to the ninth aspect of this application correspond to the technical solutions of the first aspect to the third aspect of this application, and the beneficial effects obtained in the aspects and the corresponding feasible implementations are similar. Therefore, the details are not described herein.

DESCRIPTION OF EMBODIMENTS

This application relates to the field of photography. For ease of understanding the method provided in this application, some terms in the field of photography are described below.

1. Binning (Binning)

Binning is an image readout mode in which induced charges in adjacent pixels are added together and read out in a mode of a one pixel. For example, during capturing of an image by an electronic device, a light reflected by a target object is collected by a camera, so that the reflected light is transmitted to an image sensor. The image sensor includes a plurality of photosensitive elements. A charge collected by each photosensitive element is one pixel, and a binning operation is performed on pixel information. Specifically, n×n pixels may be combined into one pixel through the binning. For example, adjacent 2×2 pixels may be synthesized into one pixel through the binning. In other words, colors of the adjacent 2×2 pixels are presented in a form of one pixel.

Figure 1:
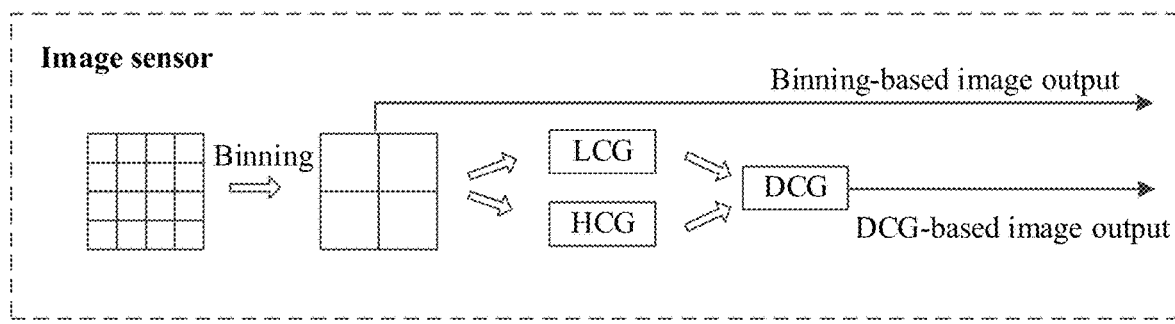
FIG. 1 is a schematic principle diagram of binning and a DCG according to an embodiment of this application.

As an example, FIG. 1 is a schematic principle diagram of binning and a DCG according to an embodiment of this application. As shown in FIG. 1, for an image with a 4×4 pixel, adjacent 2×2 pixels may be synthesized into one pixel through the binning. Therefore, the image sensor may perform binning on the 4×4 image to obtain a 2×2 image, and output the 2×2 image as a binning-based image of the image sensor.

2. Dual Conversion Gain (Dual Conversion Gain, DCG)

For an image sensor having a dual conversion gain DCG capability, since one pixel has two potential wells that correspond to different full well capacities and different conversion gains CG, a large full well capacity corresponds to a low conversion gain (LCG), and a low photosensibility, and a small full well capacity corresponds to a high conversion gain (HCG) and a high photosensibility, the sensor may use the two potential wells (two different photosensibilities) and the two conversion gains in a same scene, to obtain two images, that is, an image in a high photosensibility mode and an image in a low photosensibility mode through one exposure. An electronic device then synthesizes the obtained two images into one image, which is an HDR technology.

As an example, as shown in FIG. 1, after adjacent n×n pixels are synthesized into one pixel, the image sensor may further use two conversion gains. For example, the image sensor may obtain image output data respectively based on two conversation gains, HCG and LCG, fuse the HCG-based image output data and the LCG-based image output data to obtain a fused image, and output the fused image as a DCG-based image from the image sensor.

3. Magic-Log (Magic-Log) Technology

Every movie has a stylized tone, and footage recorded for a movie is generally a low-saturation and low-contrast gray film. Such a gray film has a great number of highlight and shadow details and offers great flexibility for post production, and is called a Log video. A magic-log technology adopts a log function curve fitting perception of human eyes based on a characteristic that human eyes are more sensitive to a brightness change in a dark region, to avoid overexposure and underexposure, and to retain wide highlight, dark, and color gamut ranges.

4. 3D Look Up Table (Look Up Table, LUT) Technology

A 3D LUT technology is a toning tool for restoring a color of a log video. A conventional filter adjusts a parameter such as an exposure and a color temperature. The 3D LUT can implement mapping transformation of RGB colors in an original material, so that richer tones can be implemented based on the 3D LUT technology.

5. HDR10 Video

An HDR10 video is configured based on static metadata. For example, a conversion curve, that is, a PQ curve of the HDR10 is fixedly mapped based on a reference display brightness of a display. A bit depth of the HDR10 video is 10 bits. The static metadata may satisfy definition in SMPTE ST 2086 or another standard.

6. HDR10+ Video

HDR10+ is a further improvement based on HDR10. The HDR10+ supports dynamic metadata, that is, the HDR10+ can adjust or enhance an image brightness, a contrast, a color saturation, and the like based on different scenes in a video, so that each frame in an HDR10+ video has an independently adjustable HDR effect. A bit depth of the HDR10+ video is 12 bits. The dynamic metadata may satisfy definition in SMPTE ST 2094 or another standard.

7. Brightness Scene

A brightness scene may also be referred to as a brightness level. In embodiments of this application, the brightness scene may be used for distinguishing between brightnesses corresponding to different image frames. The brightness scene may include a high brightness scene, a moderate brightness scene, a low brightness scene, and the like.

As an example, the brightness scene may correspond to different brightness ranges. For example, a first device may distinguish between different brightness scenes based on a lighting intensity (or referred to as an illuminance). For example, a brightness range corresponding to the high brightness scene may be greater than 50000 luxes (lux), a brightness range corresponding to the moderate brightness scene may be 50000 luxes to 10 luxes, and a brightness range corresponding to the low brightness scene may be 10 luxes to 0 luxes.

It may be understood that the brightness scene described in the embodiments of this application may not be limited to the three types mentioned above. Moreover, the brightness ranges corresponding to the three brightness scenes are merely an example, and the brightness ranges corresponding to different brightness scenes may also be other values. This is not limited in the embodiments of this application.

For ease of describing the technical solutions in the embodiments of this application clearly, in the embodiments of this application, words such as "first" and "second" are used for distinguishing between same or similar items with a basically same function and role. For example, a first value and a second value are merely used for distinguishing between different values, and are not intended to limit a sequence thereof. A person skilled in the art may understand that the words such as "first" and "second" do not limit a quantity and an execution order, and the words such as "first" and "second" are not limited to be necessarily different.

It should be noted that, in this application, words such as "as an example" or "for example" represent giving an example, an illustration, or a description. Any embodiment or design solution described as "as an example" or "for example" in the embodiments of this application should not be explained as being more preferred or having more advantages than another embodiment or design solution. Exactly, use of the words such as "as an example" or "for example" is intended to present a concept in a specific manner.

In this application, at least one means one or more, and a plurality of means two or more. "And/or" describes an association relationship between associated objects and indicates that three relationships may exist. For example, A and/or B may represent the following cases: only A exists, both A and B exist, and only B exists. A and B may be singular or plural. The character "/" generally indicates that the associated objects are in an "or" relationship. "At least one of the following items" or a similar expression thereof indicates any combination of these items, including a single item or any combination of a plurality of items. For example, at least one of a, b, or c may represent: a, b, c, a and b, a and c, b and c, or a, b, and c, a, b, and c may be one or more.

Figure 2:
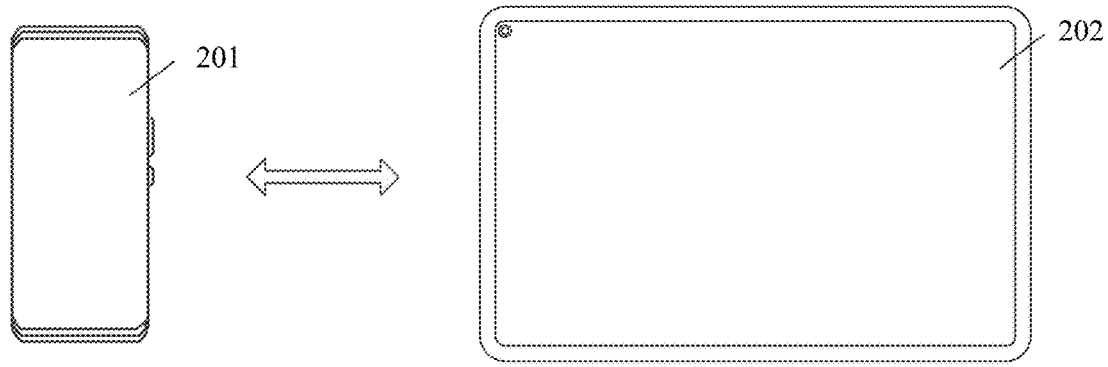
FIG. 2 is a schematic diagram of a scene according to an embodiment of this application.

As an example, FIG. 2 is a schematic diagram of a scenario according to an embodiment of this application. As shown in FIG. 2, the scenario may include a first device 201 and a second device 202. In the embodiment corresponding to FIG. 2, an example in which the first device 201 is a mobile phone and the second device 202 is a tablet computer is described. The example does not constitute a limitation to this embodiment of this application.

In a possible implementation, the first device 201 may be configured to record a video through a camera and send the video content to the second device 202, so that the second device 202 may be configured to display the video through a display.

During video recording by the first device 201 through the camera, the first device 201 may retain, by using a magic-log technology, a maximum amount of dynamic range information of a picture captured by a sensor of the camera, and convert the dynamic range information into HDR videos with different color styles through a 3D LUT technology. The video may be an HDR10 video supporting a BT.2020 wide color gamut. Further, the first device 201 may send the HDR10 video to the second device 202.

During playback of the HDR10 video by the second device 202 through the display, since the HDR10 video is configured based on static metadata, for example, a conversion curve, that is, a PQ curve of the HDR10 is fixedly mapped based on an absolute brightness, where the absolute brightness may be a reference display brightness of the display of the second device 202, for example, 1000 nits, when the HDR10 video is displayed on the second device with a peak brightness up to 1000 nits, the PQ curve can well present normal mapping of a brightness within 1000 nits. The peak brightness may be understood as a maximum brightness hardware of the second device may support.

However, when the hardware of the second device 202 may support a peak brightness less than 1000 nits, for example, the hardware of the second device 202 may support a peak brightness of 500 nits, if an HDR10 video with a reference display brightness of 1000 nits is displayed on the second device 202 whose hardware may support the peak brightness of 500 nits, the second device 202 cannot implement brightness mapping of a high brightness scene of greater than 500 nits and less than 1000 nits, resulting in a loss of highly bright information in the high brightness scene.

Therefore, when the first device 201 records the video through the camera and sends the video content to the second device 202 so that the second device 202 plays the video through the display, the peak brightness the hardware of the second device 202 may support affects display of the HDR10 video obtained based on the PQ curve.

In view of the above, the embodiments of this application provide a video processing method. A first device may match different dynamic metadata for different brightness scenes corresponding to a plurality of frames of images obtained based on a camera, adjust the plurality of frames of images by using the different dynamic metadata, to obtain an HDR video, and send the HDR video to a second device, so that the second device may perform brightness mapping on the HDR video based on the HDR video and a peak brightness hardware of the second device may support, and display a video content with an appropriate brightness.

It may be understood that, the above first device (or the second device) may also be referred to as a terminal (terminal), a user equipment (user equipment, UE), a mobile station (mobile station, MS), a mobile terminal (mobile terminal, MT), or the like. The first device (or the second device) may be a mobile phone (mobile phone) supporting a video recording function (or a video playback function), an intelligent television, a wearable device, a tablet computer (Pad), a computer with a wireless transceiver function, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in smart city (smart city), a wireless terminal in smart home (smart home), or the like. A specific technology and a specific device form used by the first device (or the second device) are not limited in the embodiments of this application.

Figure 3:
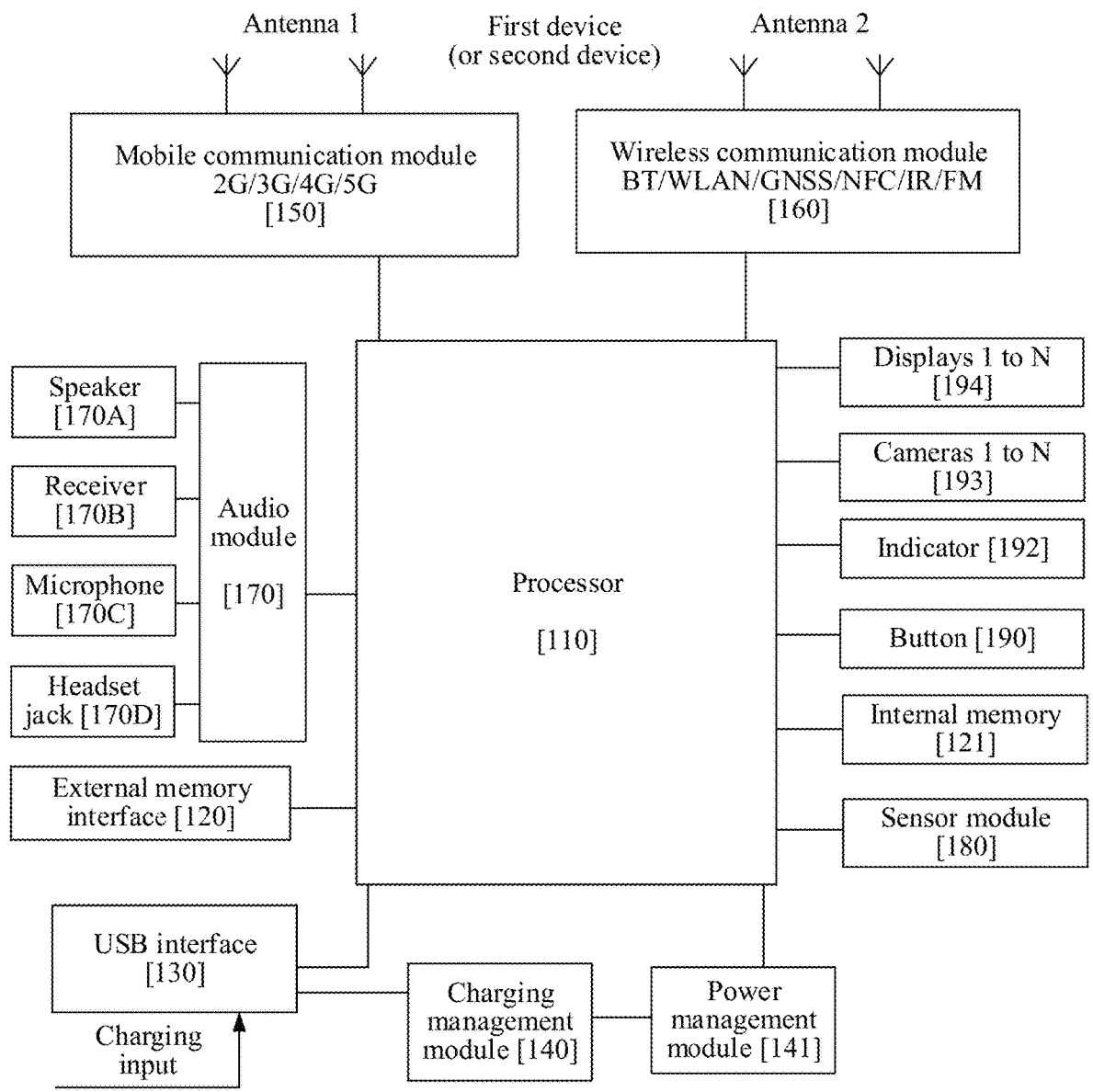
FIG. 3 is a schematic structural diagram of a first device (or a second device) according to an embodiment of this application.

Therefore, in order to better understand the embodiments of this application, a structure of the first device (or the second device) in the embodiments of this application is described below. As an example, FIG. 3 is a schematic structural diagram of a first device (or a second device) according to an embodiment of this application.

The first device (or the second device) may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a receiver 170B, a microphone 170C, a headset jack 170D, a sensor module 180, a button 190, an indicator 192, a camera 193, a display 194, and the like.

It may be understood that the schematic structure illustrated in this embodiment of this application constitutes no specific limitation to the first device (or the second device). In some other embodiments of this application, the first device (or the second device) may include more or fewer components than those shown in the figure, or some components may be combined, or some components may be split, or a different component arrangement may be used. The components shown in the figure may be implemented by hardware, software, or a combination of software and hardware.

The processor 110 may include one or more processing units. Different processing units may be independent devices, or may be integrated into one or more processors. A memory may be further arranged in the processor 110, which is configured to store instructions and data.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The USB interface 130 is an interface that complies with the USB standard specification, and may be specifically a mini USB interface, a micro USB interface, a USB type C interface, or the like. The USB interface 130 may be configured to be connected to a charger to charge the first device (or the second device), or may be configured for data transmission between the first device (or the second device) and a peripheral device, or may be configured to be connected to a headset to play audio through the headset. The interface may be further configured to be connected to another first device (or a second device), for example, an AR device.

The charging management module 140 is configured to receive a charging input from the charger. The charger may be a wireless charger or a wired charger. The power management module 141 is configured to be connected to the charging management module 140 and the processor 110.

A wireless communication function of the first device (or the second device) may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. An antenna in the first device (or the second device) may be configured to cover one or more communication frequency bands. Different antennas may be multiplexed to improve utilization of the antennas.

The mobile communication module 150 may provide a wireless communication solution including 2G/3G/4G/5G and the like applicable to the first device (or the second device). The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and send the electromagnetic wave to the modem processor for demodulation.

The wireless communication module 160 may provide a wireless communication solution including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), and the like applicable to the first device (or the second device).

The first device (or the second device) implements a display function by using the GPU, the display 194, the application processor, and the like. The GPU is a microprocessor for image processing and is connected to the display 194 and the application processor. The GPU is configured to perform mathematical and geometric calculations for graphics rendering.

The display 194 is configured to display an image, a video, and the like. The display 194 includes a display panel. In some embodiments, the first device (or the second device) may include 1 or N displays 194. N is a positive integer greater than 1.

The first device (or the second device) may implement a photographing function by using the ISP, the camera 193, the video codec, the GPU, the display 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further perform algorithm optimization on noise, a brightness, and a skin tone of the image. The ISP may further optimize parameters such as an exposure and a color temperature of a to-be-photographed scene. In some embodiments, the ISP may be arranged in the camera 193.

The camera 193 is configured to capture a static image or a video. An optical image is generated for an object through the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format such as RGB or YUV.

The digital signal processor is configured to process a digital signal. In addition to a digital image signal, the digital signal processor may further process another digital signal. For example, when the first device (or the second device) performs frequency selection, the digital signal processor is configured to perform Fourier transform and the like on frequency energy.

The video codec is configured to compress or decompress a digital video. The first device (or the second device) may support one or more video codecs. In this way, the first device (or the second device) may play or record videos in a plurality of encoding formats, such as moving picture experts group (moving picture experts group, MPEG) 1, MPEG 2, MPEG 3, and MPEG 4.

The camera 193 is configured to capture a static image or a video. In some embodiments, the first device (or the second device) may include 1 or N cameras 193. N is a positive integer greater than 1.

The external memory interface 120 may be configured to be connected to an external storage card such as a micro SD card, to expand a storage capability of the first device (or the second device). The external storage card communicates with the processor 110 through the external memory interface 120, to implement a data storage function. For example, files such as music and a video are stored into the external storage card.

The internal memory 121 may be configured to store computer-executable program code. The executable program code includes instructions. The internal memory 121 may include a program storage area and a data storage area.

The first device (or the second device) may implement, through the audio module 170, the speaker 170A, the receiver 170B, the microphone 170C, the headset jack 170D, the application processor, and the like, an audio function such as music playback and sound recording.

The audio module 170 is configured to convert digital audio information into an analog audio signal for output, and is further configured to convert an analog audio input into a digital audio signal. The speaker 170A, also referred to as a "horn", is configured to convert an electrical audio signal into a sound signal. Music may be listened or a hands-free call may be answered through the speaker 170A in the first device (or the second device). The receiver 170B, also referred to as a "handset", is configured to convert an electrical audio signal into a sound signal. When a call is answered or audio information is listened through the first device (or the second device), the receiver 170B may be put close to a human ear to receive a voice. The headset jack 170D is configured to be connected to a wired headset.

The microphone 170C, also referred to as a "voice tube" or a "mike", is configured to convert a sound signal into an electrical signal.

The sensor module 180 may include one of more of the following sensors, such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, or a bone conduction sensor (not shown in FIG. 3).

The button 190 includes a power button, a volume button, and the like. The button 190 may be a mechanical button or a touch button. The first device (or the second device) may receive a button input, and generate a button signal input related to user setting and function control of the first device (or the second device). The indicator 192 may be an indicator light, and may be configured to indicate a charging state or a power change, or may be configured to indicate a message, a missed call, a notification, and the like.

A software system of the first device (or the second device) may use a layered architecture, an event-driven architecture, a microcore architecture, a microservice architecture, or a cloud architecture. Details are not described herein.

Figure 4:
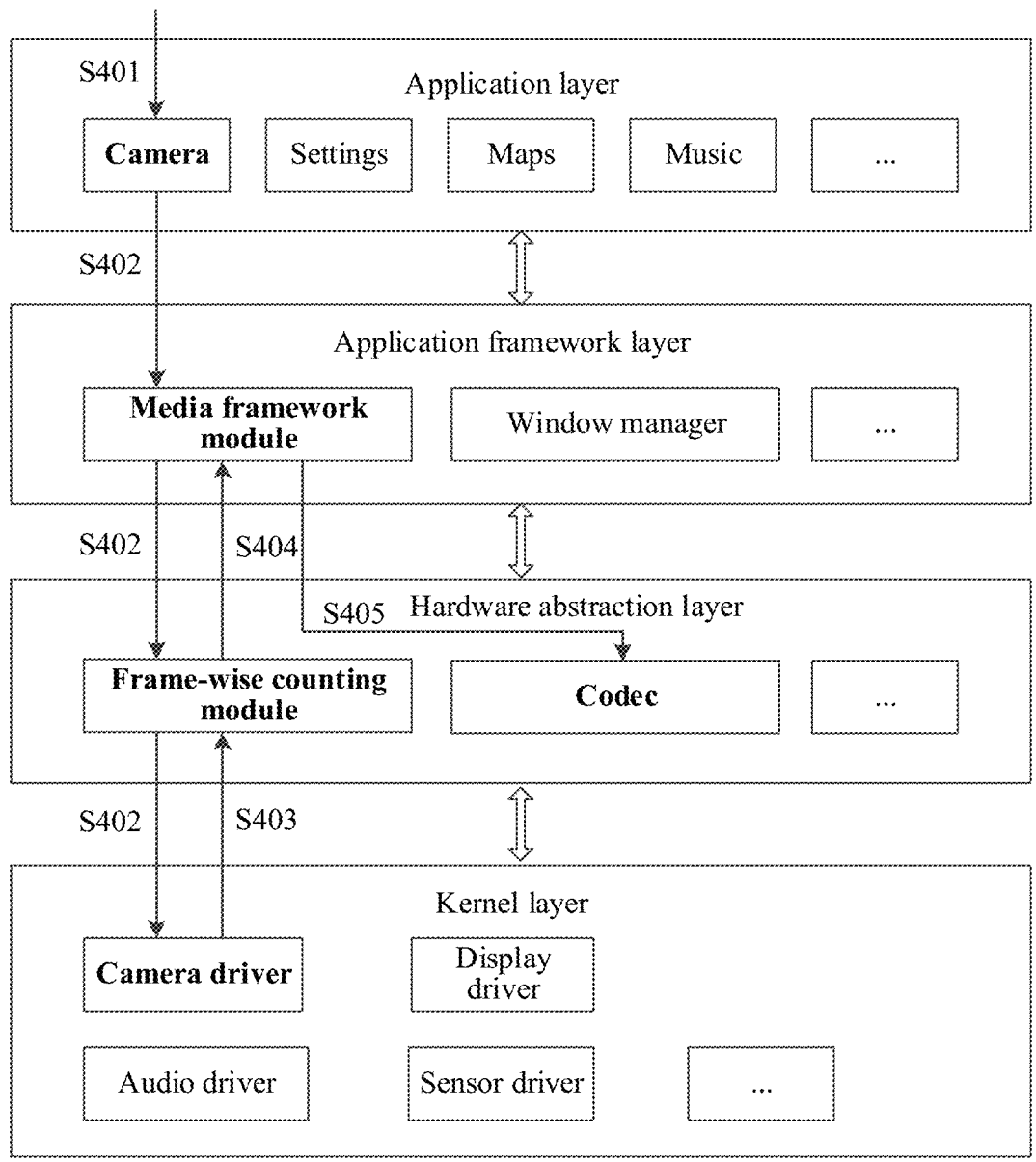
FIG. 4 is a block diagram of a software structure of a first device according to an embodiment of this application.

As an example, FIG. 4 is a block diagram of a software structure of a first device according to an embodiment of this application.

In the layered architecture, software is divided into a plurality of layers, and each layer has a clear role and task. The layers communicate with each other through a software interface. In some embodiments, the Android Android system is divided into four layers from top to bottom: an application layer, an application framework layer, a hardware abstraction layer (hardware abstraction layer, HAL), and a kernel layer.

The application layer may include a series of application packages. As shown in FIG. 4, the application packages may include one or more of the follow applications, such as Camera, Settings, Maps, and Music.

The application framework layer provides an application programming interface (application programming interface, API) and a programming framework for applications in the application layer. The application framework layer includes some predefined functions.

As shown in FIG. 4, the application framework layer may include a media framework module, a window manager, or the like.

The media framework module is configured to encode a plurality of frames of images obtained based on a camera driver to obtain a video, or the media framework module may be further configured to decode a received video to obtain the plurality of frames of images and metadata corresponding to the plurality of frames of images, such as dynamic metadata or static metadata.

The window manager is configured to manage a window application. The window manager may obtain a size of the display, determine whether a status bar exists, perform screen locking, perform screen touching, perform screen dragging, perform screenshot, and the like.

In a possible implementation, the application framework layer may further include a notification manager, a content provider, a resource manager, a view system, and the like.

The notification manager enables an application to display notification information in the status bar to convey a message of a notification type. The message may disappear automatically after a short stay without requiring user interaction. For example, the notification manager is configured to provide a notification of downloading completion, a message notification, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the device vibrates, or an indicator light flashes.

The content provider is configured to store and obtain data. The data is accessible to applications through the content provider. The data may include a video, an image, an audio, calls that are made and answered, a browse history and a bookmark, a phonebook, and the like.

The resource manager provides various resources such as a localized character string, an icon, an image, a layout file, and a video file for an application.

The view system includes visual controls such as a control for displaying a text and a control for displaying an image. The view system may be configured to construct an application. A display interface may be composed of one or more views. For example, a display interface including an SMS message notification icon may include a view for displaying a text and a view for displaying an image.

The hardware abstraction layer is configured for hardware abstraction. The hardware abstraction layer may provide, for an upper layer application, a uniform interface for querying a hardware device, such as an interface complying with a hardware abstraction layer interface definition language (HAL interface definition language, HIDL) protocol.

The hardware abstraction layer may include a frame-wise counting module, a codec, and the like.

The frame-wise counting module is configured to perform frame-wise counting on a plurality of frames of images obtained by the camera driver, determine brightness scenes corresponding to the plurality of frames of images, and match corresponding tone mapping curves, to obtain dynamic metadata respectively corresponding to the plurality of frames of images.

The codec is configured to store a result of encoding or decoding by the media framework module. For example, when the codec receives a video sent through the media framework module, the codec may store the video as required.

The hardware abstraction layer may further include an audio interface, a video interface, call interface, and a global positioning system (global positioning system, GPS) interface (not shown in FIG. 4). This is not limited in this embodiment of this application.

The kernel layer is a layer between hardware and software. The kernel layer includes at least a display driver, a camera driver, an audio driver, and a sensor driver.

A workflow of software and hardware of the first device is described as an example below with reference to a video generation scenario and the embodiment corresponding to FIG. 3.

S401: Send a corresponding hardware interrupt to the kernel layer when the touch sensor receives an operation of touching a movie mode in a camera application performed by a user, where the kernel layer processes the touch operation into an original input event (including information such as touch coordinates and a timestamp of the touch operation), and the original input event is stored in the kernel layer. The application framework layer obtains the original input event from the kernel layer, and identifies a control corresponding to the input event. Then the camera application calls the interface of the application framework layer to enable the camera application. S402: The camera application sends, through the media framework module in the application framework layer and the frame-wise counting module in the hardware abstraction layer, an instruction indicating to encode an image sequence to the camera driver in the kernel layer, and the camera driver captures the image sequence through a camera. S403: The camera driver sends the obtained image sequence to the frame-wise counting module, so that the frame-wise counting module may perform counting on the obtained image sequence, determines brightness scenes corresponding to a plurality of frames of images, and matches corresponding tone mapping curves, to obtain dynamic metadata corresponding to the plurality of frames of images. Further, the frame-wise counting module may send the plurality of frames of images and the dynamic metadata corresponding to the plurality of frames of images to the media framework module. S404: The media framework module performs encoding based on the plurality of frames of images and the dynamic metadata corresponding to the plurality of frames of images, to obtain an HDR video. S405: The media framework module sends the HDR video to the codec in the hardware abstraction layer for storage, so that the first device implements processing and recording of the HDR video.

The technical solutions of this application and how the technical solutions of this application resolve the above technical problems are described in detail below through specific embodiments. The following specific embodiments may be independently implemented, or may be combined with each other, and the same or similar concepts or processes may not be repeated in some embodiments.

In the embodiments of this application, the first device may obtain an HDR10+ video in two user triggering manners. For example, the first device may implement enabling of a 4K HDR function in the movie mode of the camera application by the user. In this case, when the first device receives an operation of enabling recording performed by the user, the first device may record the HDR10+ video based on the 4K HDR function (as shown in an embodiment corresponding to FIG. 5A, FIG. 5B, FIG. 5C, and FIG. 5D). Alternatively, the first device may implement enabling of movie HDR in a setting interface of the camera application by the user. In this case, when the first device receives the operation of enabling recording performed by the user, the first device may record the HDR10+ video based on the 4K HDR function (as shown in an embodiment corresponding to FIG. 6A, FIG. 6B, and FIG. 6C).

In an implementation, the first device may implement enabling of the 4K HDR function in the movie mode of the camera application by the user. In this case, when the first device receives the operation of enabling recording performed by the user, the first device may record the HDR10+ video based on the 4K HDR function.

As an example, FIG. 5A, FIG. 5B, FIG. 5C, and FIG. 5D are schematic diagrams of an interface of enabling photographing in a movie mode according to an embodiment of this application.

Figure 5A:
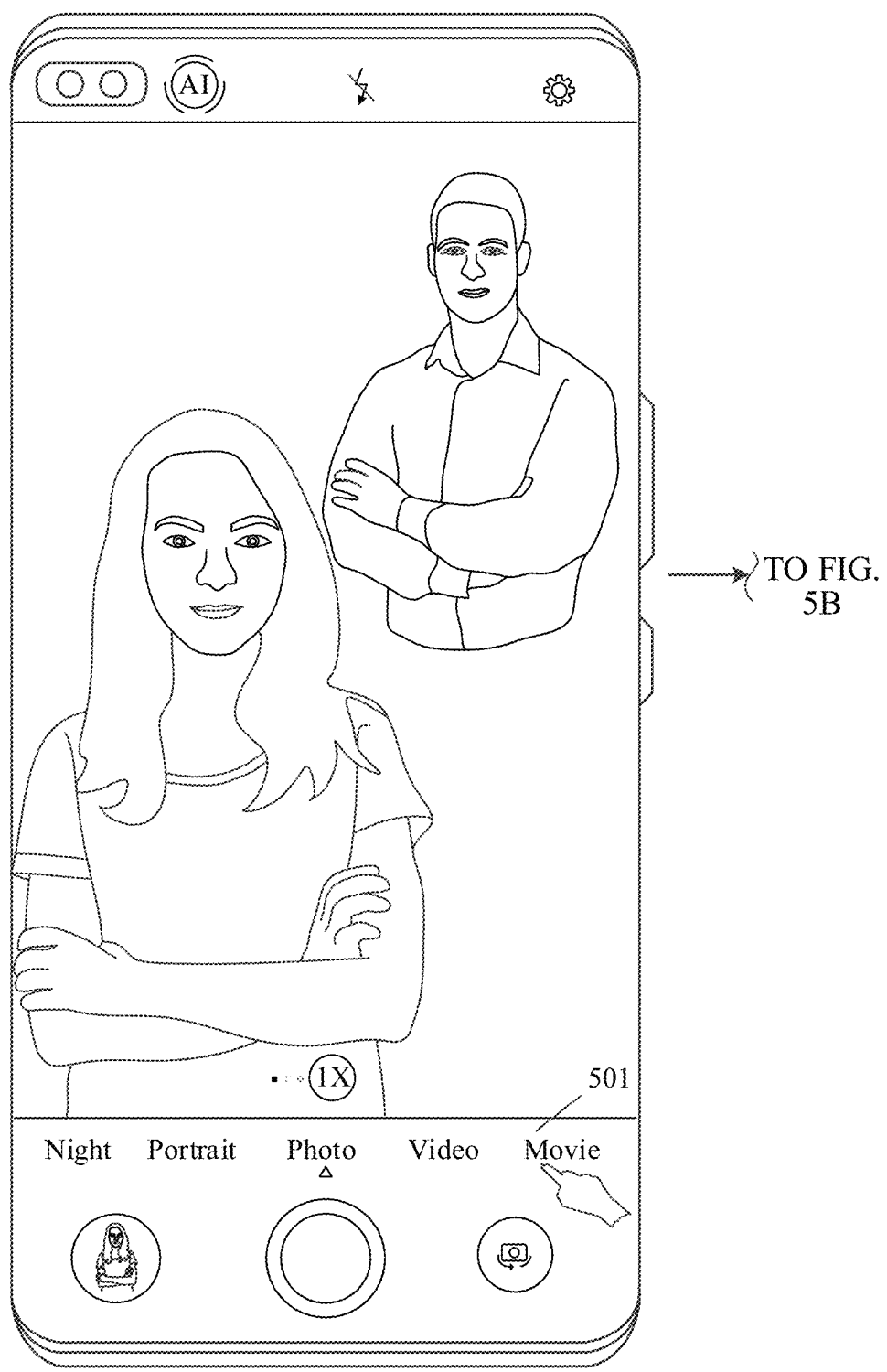
FIG. 5A, FIG. 5B, FIG. 5C, and FIG. 5D are schematic diagrams of an interface of enabling photographing in a movie mode according to an embodiment of this application.

As shown in FIG. 5A, FIG. 5B, FIG. 5C, and FIG. 5D, when the first device receives an operation of enabling the camera application performed by the user, the first device may display an interface shown in FIG. 5A. The interface may be a main interface of the camera application (or may be understood as an interface corresponding to a photographing mode). As shown in FIG. 5A, the interface may include one or more of the following controls, such as a photographing control corresponding to a photographing function, a preview image, a control for enabling an artificial intelligence (artificial intelligence, AI) photographing function, a control for enabling or disabling a flashlight, a setting control for configuring a camera application, a control for adjusting a photographing ratio, a control for flipping a camera, a control for opening photos, and the like. The interface shown in FIG. 5A may further include one or more function controls in a first-level menu of the camera application, such as a control for enabling a night mode, a control for enabling a portrait mode, a control for enabling a photographing mode, a control for enabling a recording mode, and a control 501 for enabling a movie mode. The control for opening photos may be configured to enable a photos application. The photos application is a picture management application on an electronic device such as a smartphone or a tablet computer, and is also referred to as an "album". A name of the application is not limited in this embodiment. The photos application may allow the user to perform various operations such as browsing, editing, deletion, and selection on videos stored in the first device.

The camera application may be an application supported by a system of the first device, or the camera application may be an application having a video recording function or the like. The movie mode is a photographing mode for obtaining an HDR video. The operation of enabling photographing may be a voice-based operation, or may be a tapping or sliding operation for a control for enabling photographing in the movie mode.

Figure 5B:
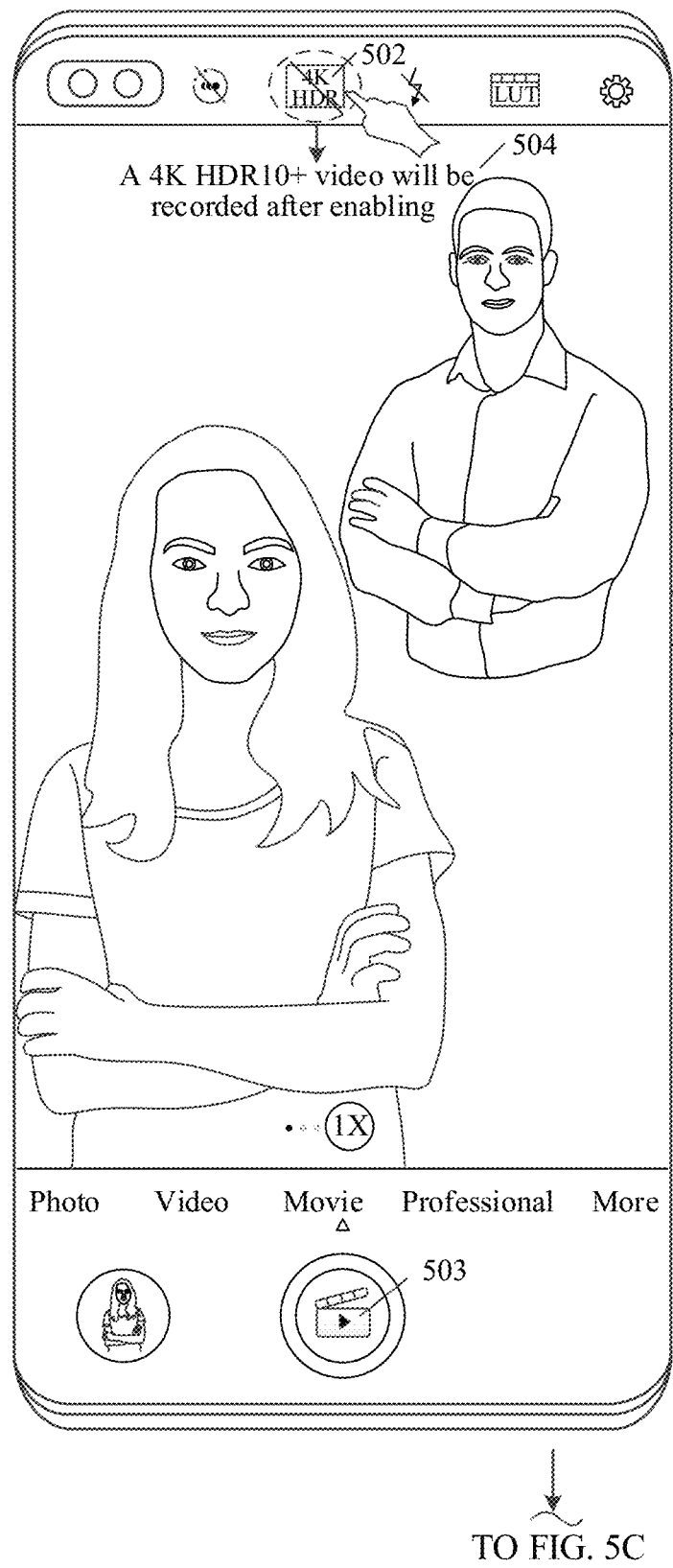

In the interface shown in FIG. 5A, when the first device receives an operation of triggering the control 501 for enabling the movie mode performed by the user, the first device may display an interface shown in FIG. 5B. The interface shown in FIG. 5B may be an interface corresponding to the movie mode. The interface may include one or more of the following controls, such as a slow-motion function control, a 4K HDR function control 502, a control for enabling or disabling a flashlight, a LUT function control, a setting control for configuring a camera application, and a control 503 for enabling photographing in a movie mode. The interface shown in FIG. 5B may further include one or more function controls in the first-level menu of the camera application, such as a control for enabling a professional mode and a control for enabling more functions, and the like. For other content displayed in the interface, refer to the interface shown in FIG. 5A. Details are not described herein.

In a possible implementation, when the first device receives the operation of triggering the control 501 in the movie mode performed by the user for a first time, the interface shown in FIG. 5B may include prompt information 504 corresponding to the 4K HDR function control 502 (a control within a range of a dashed-line box). The prompt information 504 indicates that the first device will record a 4K HDR10+ video after the user enables the 4K HDR function control 502.

In the interface shown in FIG. 5B, the 4K HDR function control 502 may be in a disabled state by default. When the first device receives an operation of triggering the 4K HDR function control 502 performed by the user, the first device may display an interface shown in FIG. 5C. The interface shown in FIG. 5C may include prompt information 505. The prompt information 505 indicates that a 4K HDR10+ mode is enabled. The prompt information 505 may disappear after 2 seconds or another time.

Figure 5C:
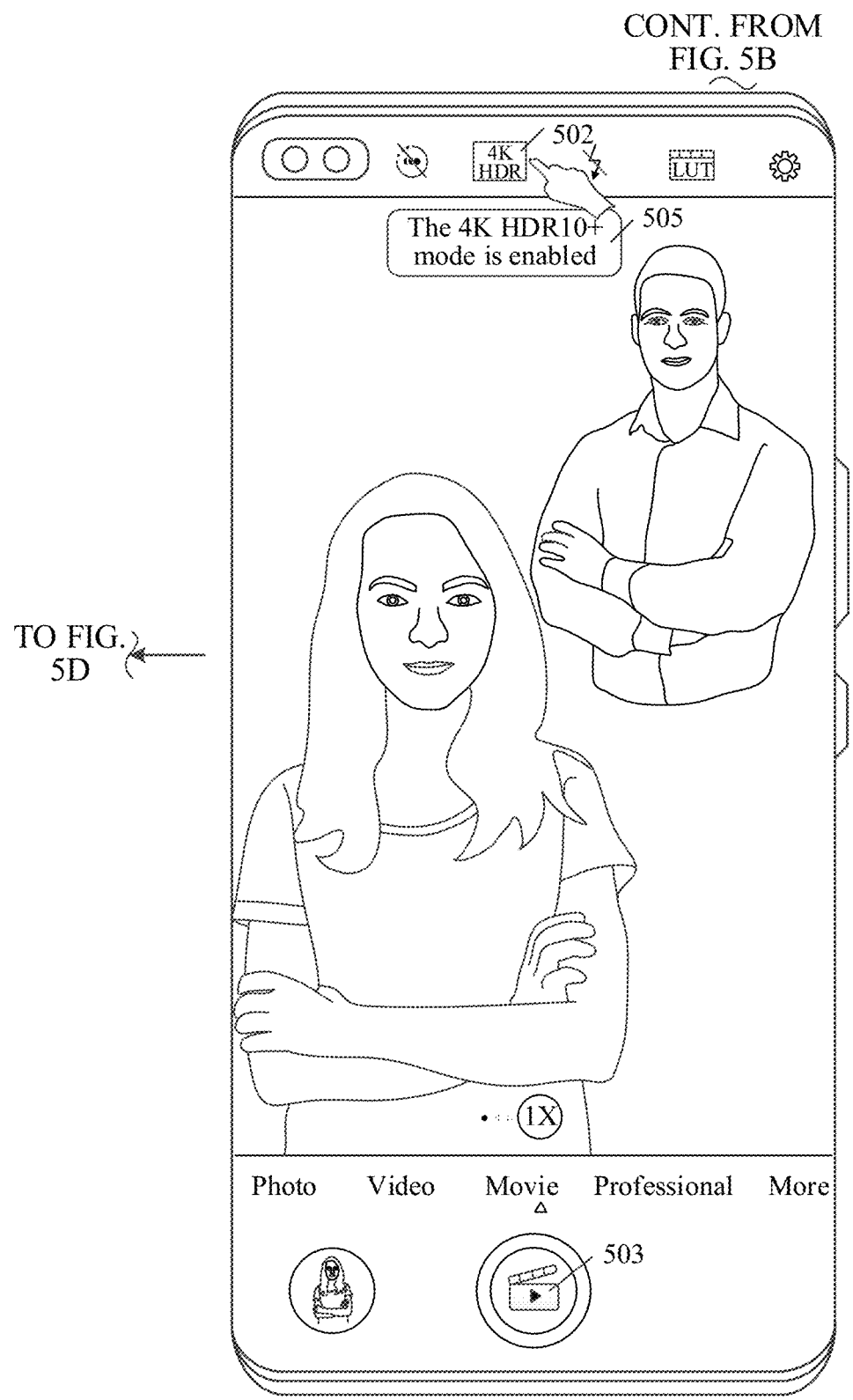

Further, when the 4K HDR function control 502 may be in an enabled state, when the first device receives an operation of triggering the control 503 for enabling photographing performed by the user in the interface shown in FIG. 5C, the first device may obtain the image sequence based on the camera, and obtain a first HDR10+ video based on processing of the image sequence. Other content displayed in the interface shown in FIG. 5C is similar to the content in the interface shown in FIG. 5B. Details are not described herein.

Figure 5D:
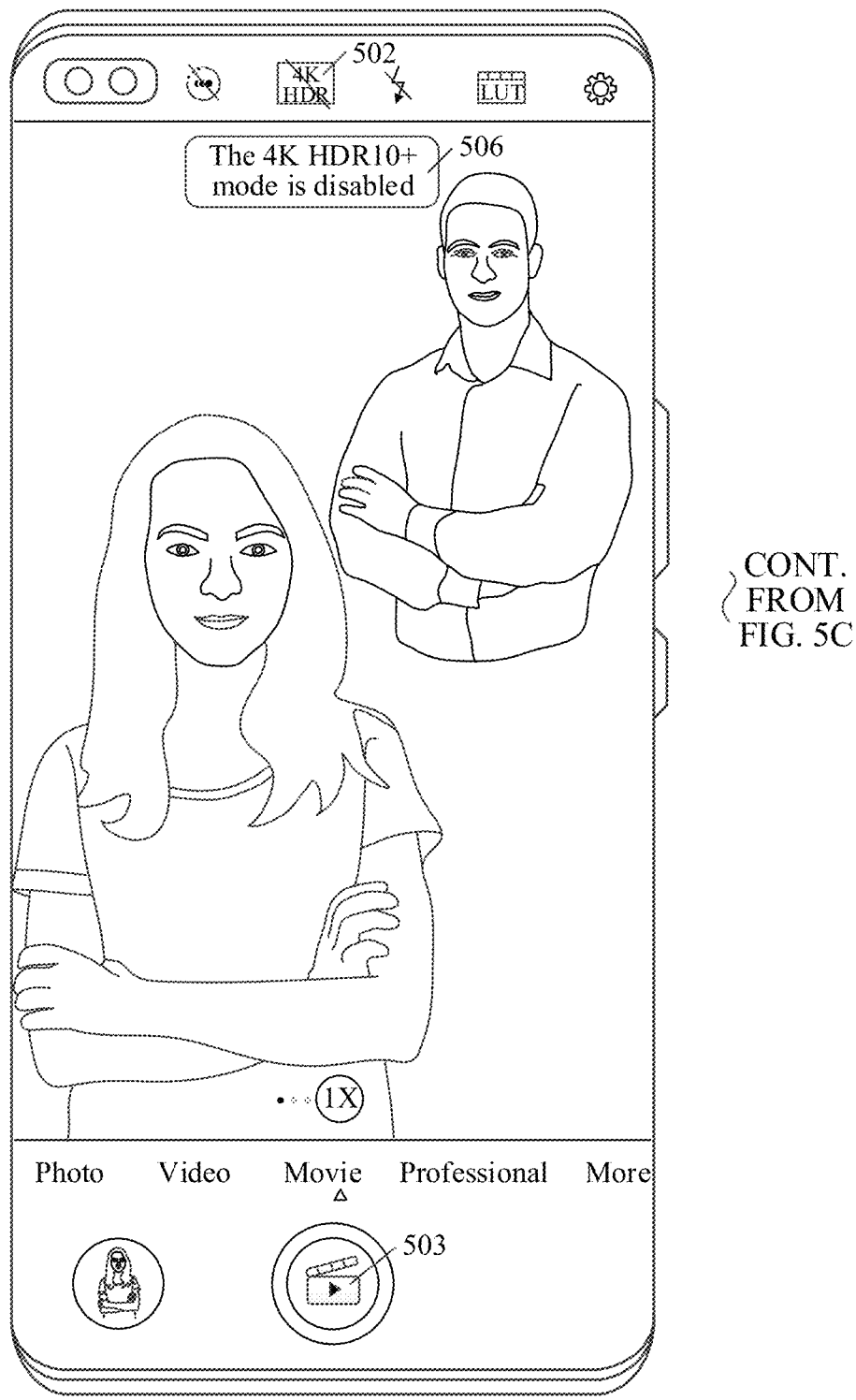

In a possible implementation, if the 4K HDR function control 502 shown in FIG. 5C is in the enabled state, when the first device receives the operation performed by the user on the 4K HDR function control 502, the first device may display an interface shown in FIG. 5D. The interface shown in FIG. 5D may include prompt information 506. The prompt information 506 indicates that the 4K HDR10+ mode is disabled. The prompt information 506 may disappear after 2 seconds or another time.

It may be understood that 4K is resolution of a screen. The resolution of 4K is 4096×2160. An HDR is a screen rendering technology. The 4K HDR function may provide an image with more dynamic ranges and image details compared with an ordinary image, which can reflect a visual effect in a real environment more effectively. In this mode, a video recorded by an electronic device 100 has a 4K resolution at 30 fps. The 4K HDR function is initially in the disabled state. In this case, an oblique line indicating that a switch is turned off is arranged on the 4K HDR function control 502 in the interface shown in FIG. 5B. When the first device detects the operation of triggering the 4K HDR function control 502 performed by the user, the first device enables the 4K HDR function, and the oblique line indicating that the switch is turned off arranged on the 4K HDR function control 502 in the interface shown in FIG. 5C disappears. Further, when the first device detects the operation of triggering the 4K HDR function control 502 performed by the user in the interface shown in FIG. 5C, the first device disables the 4K HDR function, and an oblique line indicating that the switch is turned off arranged on the 4K HDR function control 503 in the interface shown in FIG. 5D is displayed.

It may be understood that, when the 4K HDR function is disabled, resolution of a preview picture is lower than a resolution of a preview picture when the 4K HDR function is enabled. When the 4K HDR function is enabled, the HDR10 video may be displayed in the preview picture.

Based on the above, the user may flexibly control the 4K HDR control in the movie mode based on a photographing requirement, thereby implementing recording of the HDR10+ video.

In another implementation, the first device may implement enabling of movie HDR in the setting interface of the camera application by the user. In this case, when the first device receives the operation of enabling recording performed by the user, the first device may record the HDR10+ video based on the 4K HDR function.

Figure 6A:
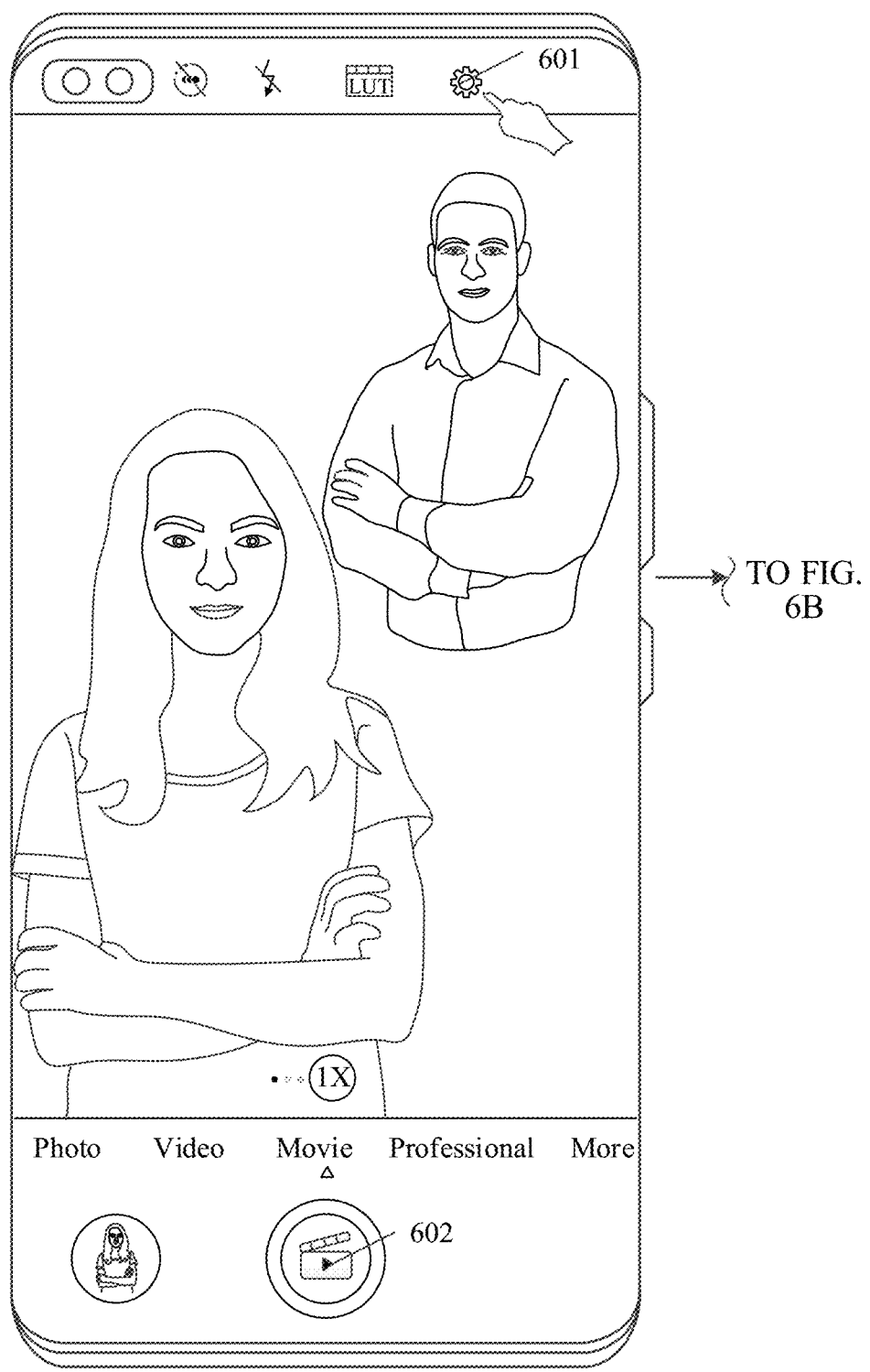
FIG. 6A, FIG. 6B, and FIG. 6C are schematic diagrams of another interface of enabling photographing in a movie mode according to an embodiment of this application.
Figure 6B:
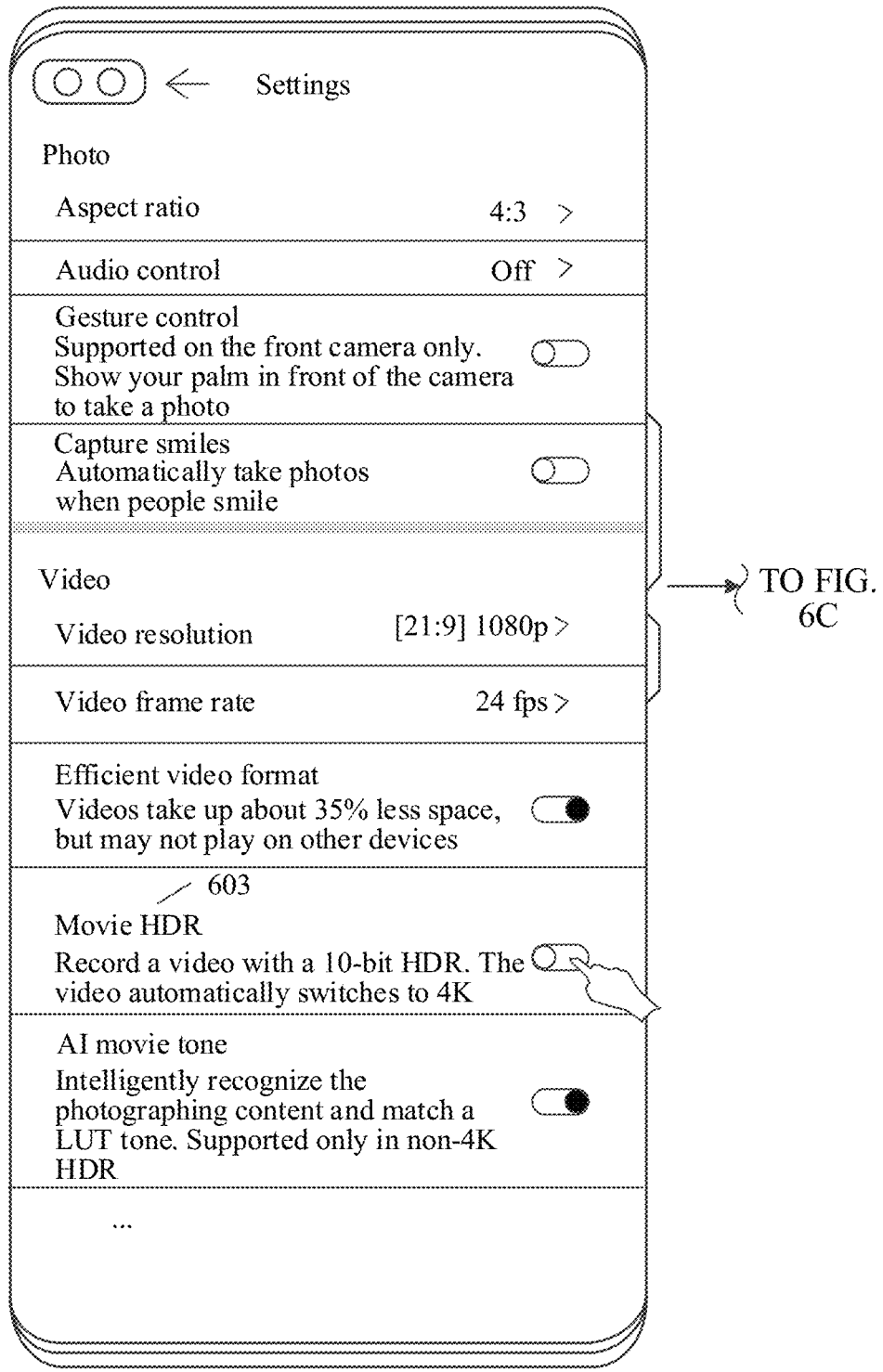
Figure 6C:
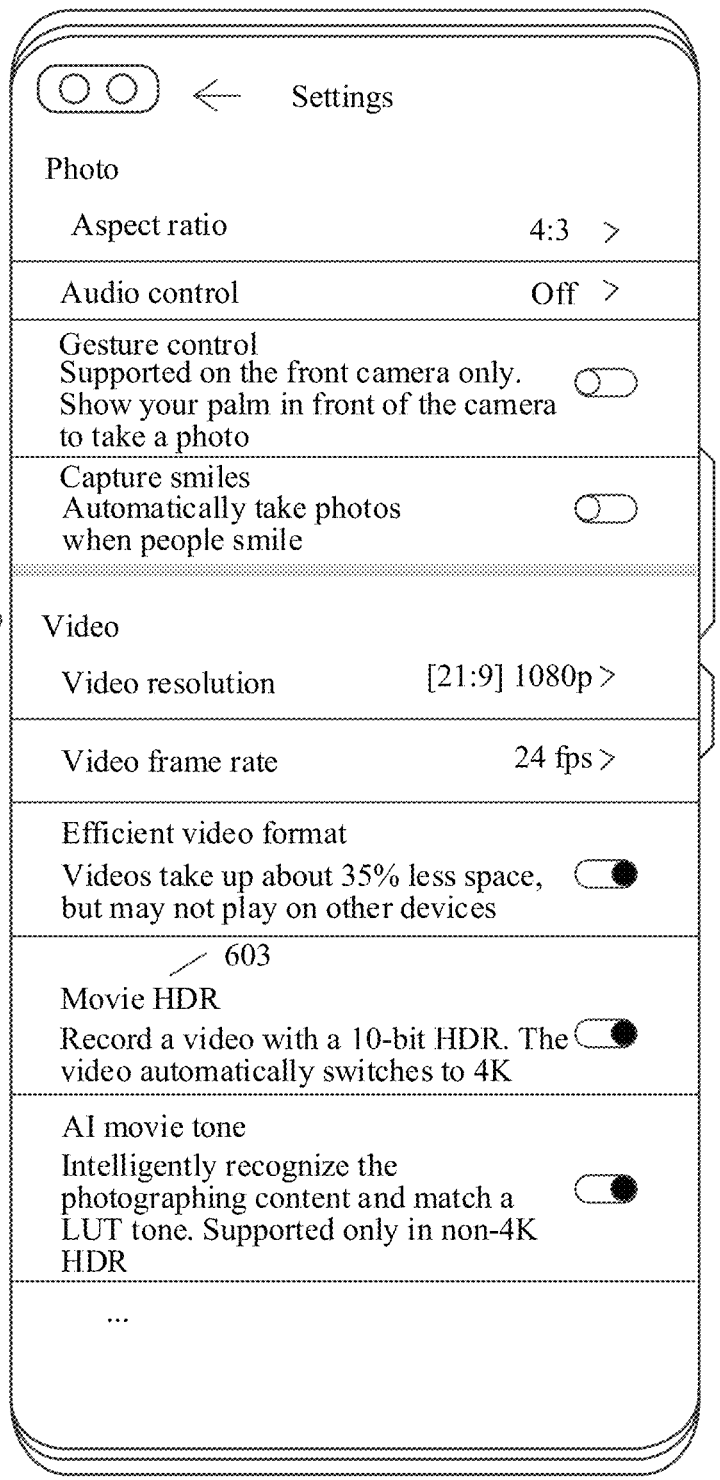

It may be understood that compared to the embodiment corresponding to FIG. 5A, FIG. 5B, FIG. 5C, and FIG. 5D, an interface in the embodiment corresponding to in FIG. 6A, FIG. 6B, and FIG. 6C where the movie mode is located does not have the 4K HDR function control. Therefore, the first device cannot record the HDR10+ video based on the operation of triggering the 4K HDR function control performed by the user.

As an example, FIG. 6A, FIG. 6B, and FIG. 6C are schematic diagrams of another interface of enabling photographing in a movie mode according to an embodiment of this application.

When the first device receives an operation of enabling the movie mode performed by the user, the first device may display an interface shown in FIG. 6A. The interface may include a setting control 601 and a control 602 for enabling photographing in the movie mode. Other content displayed in the interface is similar to the content in the interface shown in FIG. 5B. Details are not described herein. Compared with the interface shown in FIG. 5B, the interface shown in FIG. 6A does not include the 4K HDR function control.

When the first device receives an operation of triggering the setting control 601 performed by the user, the first device may display an interface shown in FIG. 6B. The interface may be the setting interface of the camera application. The interface shown in FIG. 6B may include function controls corresponding to the photographing, such as a photo ratio function control (which, for example, supports a photo ratio of 4:3), a sound control photographing control, a gesture-based photographing function control, and a smile snapshot function control. The gesture-based photographing function may support use of a front camera only, and is triggered by a gesture made in front of the front camera. The smile snapshot function may perform automatic photographing when detecting a smile. The interface may further include function controls corresponding to a video function, such as a video resolution function control, a video frame rate function control, an efficient video format function control, a movie HDR function control 603, and an AI movie tone function control. The efficient video format function control may save a space of 35%, and the user may not play a video in the format on another device. The movie HDR function may record a video with a 10-bit HDR, and the video is automatically switched to 4K. The AI movie tone function may intelligently recognize a to-be-photographed content and match a LUT tone, and is supported only in a non-4K HDR.

In the interface shown in FIG. 6B, when the first device receives an operation of enabling the movie HDR function control 603 performed by the user, the first device may display an interface shown in FIG. 6C. The movie HDR function control 603 in the interface is in an enabled state. Other content displayed in the interface shown in FIG. 6C is similar to the content in the interface shown in FIG. 6B. Details are not described herein.

Further, if the movie HDR function control 603 in the interface shown in FIG. 6C is in the enabled state, when the first device receives an operation of exiting the setting interface performed by the user and receives an operation of triggering the control 602 for enabling photographing performed by the user in the interface shown in FIG. 6A, the first device may obtain the image sequence based on the camera, and obtain the first HDR10+ video based on processing of the image sequence. It may be understood that when the movie HDR function control is in the enabled state, the HDR10 video may be displayed in the preview picture.

Based on the above, the user may flexibly control the movie HDR function control in the function settings based on a photographing demand, thereby implementing recording of the HDR10+ video.

In a possible implementation, based on the embodiment corresponding to FIG. 5A, FIG. 5B, FIG. 5C, and FIG. 5D (or the embodiment corresponding to FIG. 6A, FIG. 6B, and FIG. 6C), when the first device receives an operation of viewing function details of the camera performed by the user, the first device may display a mode introduction corresponding to the movie mode.

Figure 7A:
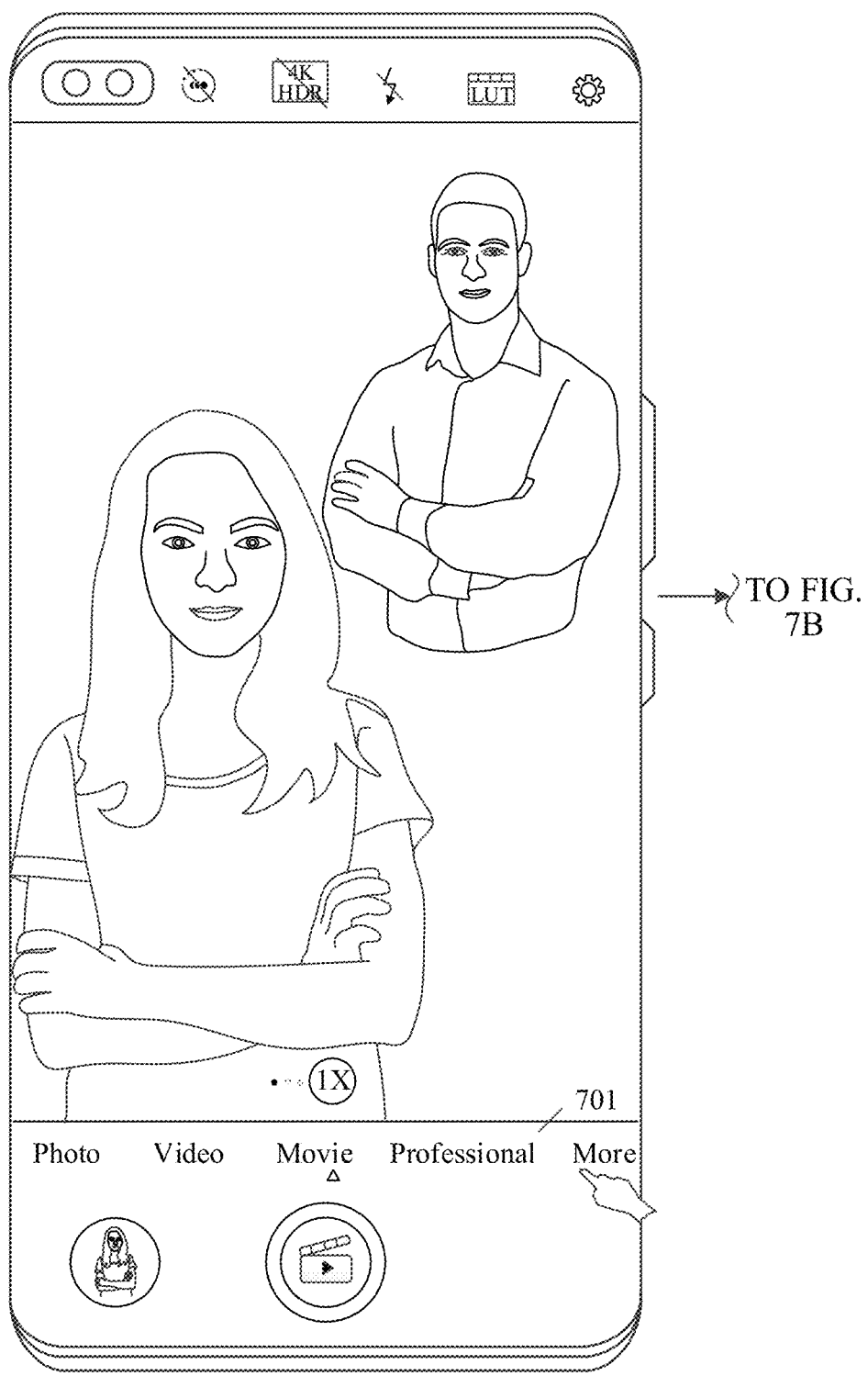
FIG. 7A, FIG. 7B, and FIG. 7C are schematic diagrams of an interface of viewing function details according to an embodiment of this application.
Figure 7B:
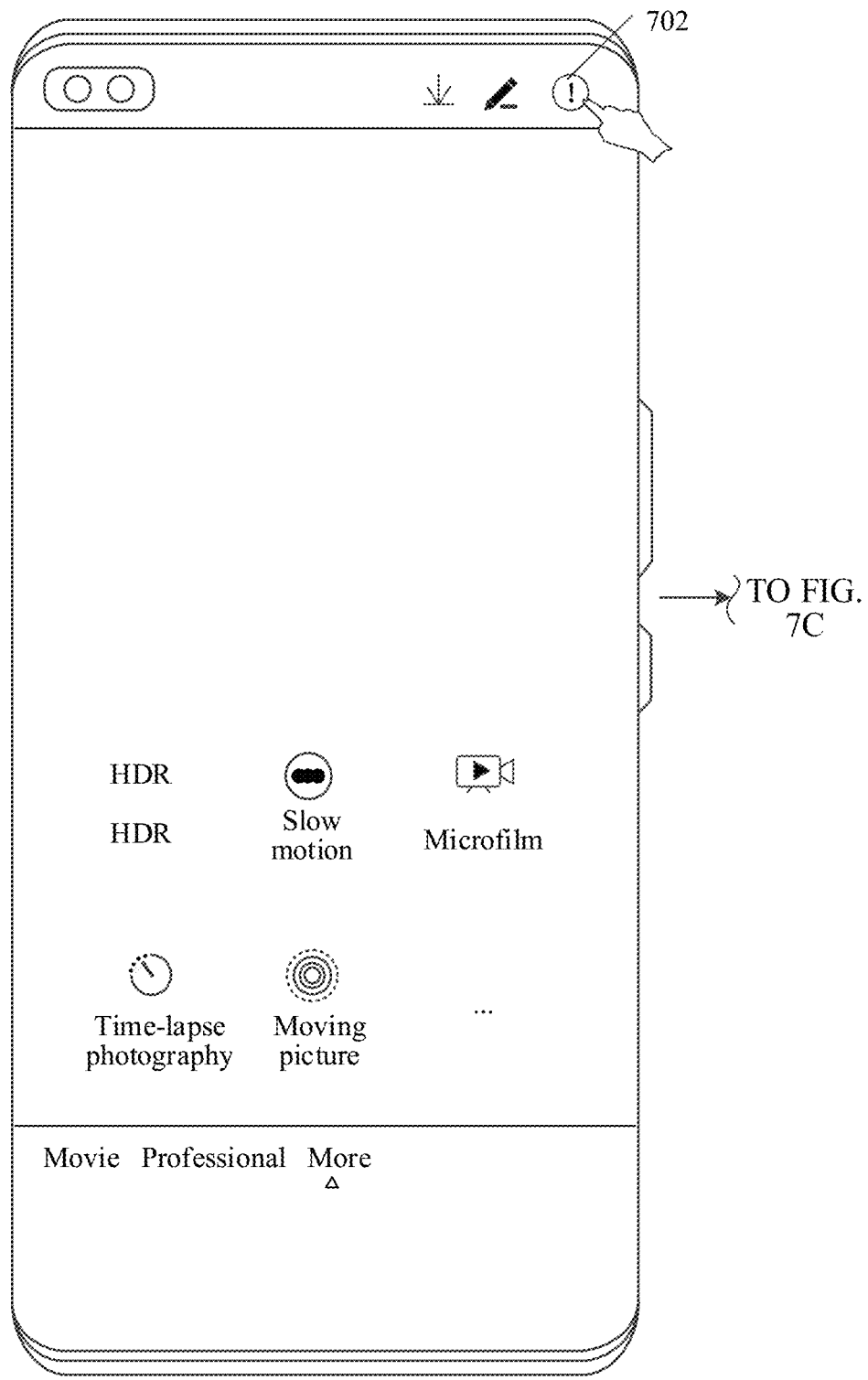
Figure 7C:
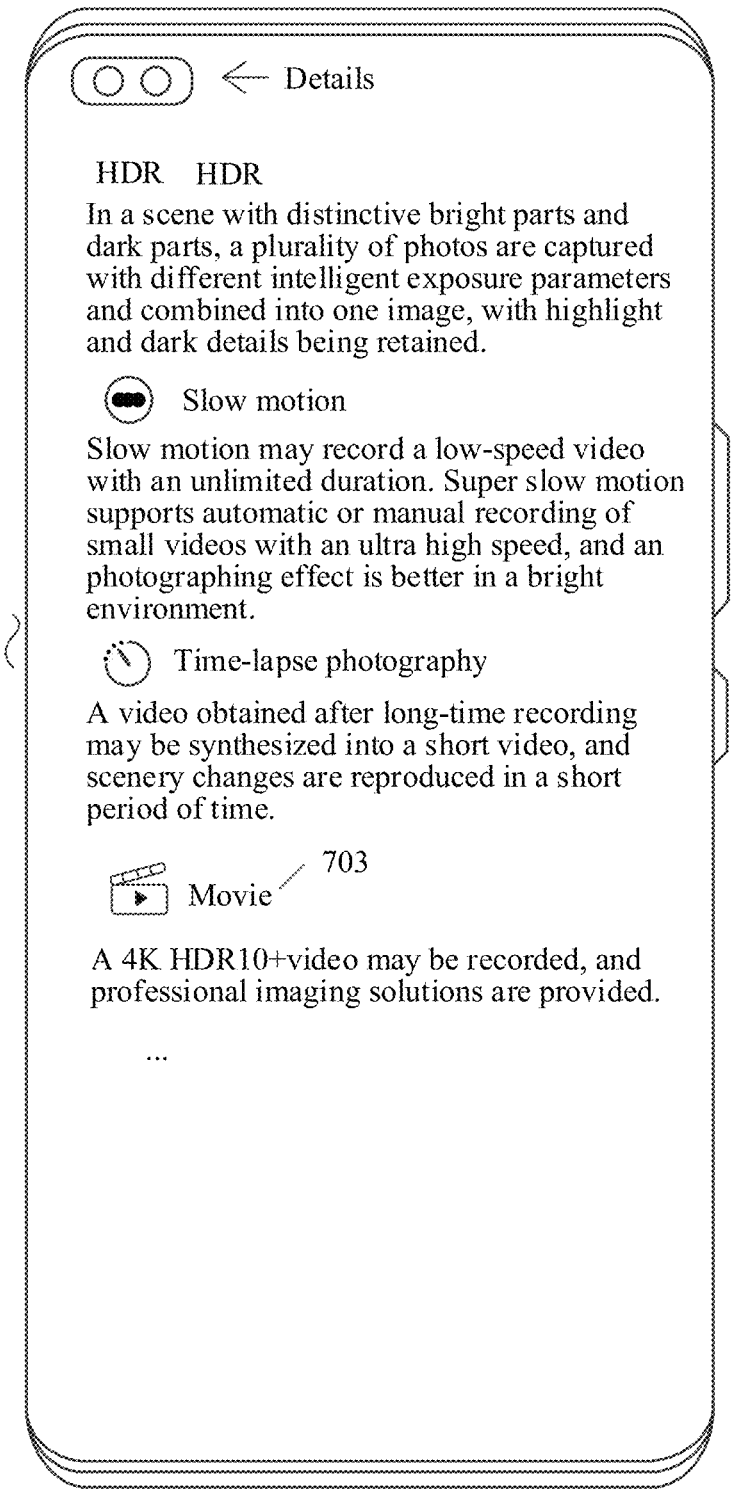

As an example, FIG. 7A, FIG. 7B, and FIG. 7C are schematic diagrams of an interface of viewing function details according to an embodiment of this application. The interface shown in FIG. 7A may include a control 701 for enabling more functions. Other content displayed in the interface is similar to the content in interface shown in FIG. 5B. Details are not described herein.

In the interface shown in FIG. 7A, when the first device receives an operation of triggering the control 701 for enabling more functions performed by the user, the first device may display an interface shown in FIG. 7B. The interface shown in FIG. 7B may include an HDR function control, a slow-motion function control, a microfilm function control, a time-lapse photography function control, a live photo function control, a download control for downloading more functions, an editing for adjusting positions of functions in the more controls function, a details control 702 for viewing details of the functions in the camera application, and the like.

In the interface shown in FIG. 7B, when the first device receives an operation performed by the user on the details control 702, the first device may display an interface shown in FIG. 7C. The interface shown in FIG. 7C may display detailed descriptions corresponding to the functions in the camera application. For example, the interface may include: a detailed description corresponding to the HDR function, which, for example, includes: in a scene with distinctive bright parts and dark parts, a plurality of photos are captured with different intelligent exposure parameters and combined into one image, with highlight and dark details being retained; a detailed description corresponding to the slow-motion function, which, for example, includes: slow motion may record a low-speed video with an unlimited duration, super slow motion supports automatic or manual recording of small videos with an ultra high speed, and an photographing effect is better in a bright environment; a detailed description corresponding to the time-lapse photography function, which, for example, includes: a video obtained after long-time recording may be synthesized into a short video, and scenery changes are reproduced in a short period of time; and a detailed description 703 corresponding to the movie mode, which, for example, includes: a 4K HDR10+ video may be recorded, professional imaging solutions are provided, and the like.

It may be understood that the detailed description corresponding to the movie mode may alternatively be other content, which is not limited in this embodiment of this application.

Based on the above, the user may learn effects of the functions in the camera application through a detail page shown in FIG. 7C, thereby improving user experience of the camera application.

Based on the embodiment corresponding to FIG. 5A, FIG. 5B, FIG. 5C, and FIG. 5D or FIG. 6A, FIG. 6B, and FIG. 6C, the first device may process the image sequence obtained based on the camera, to obtain a preview image sequence corresponding to a preview stream. In addition, the first device may process the image sequence obtained based on the camera, to obtain an HDR10+ video corresponding to a recording stream. The processing may include image pre-processing and image post-processing.

Figure 8:
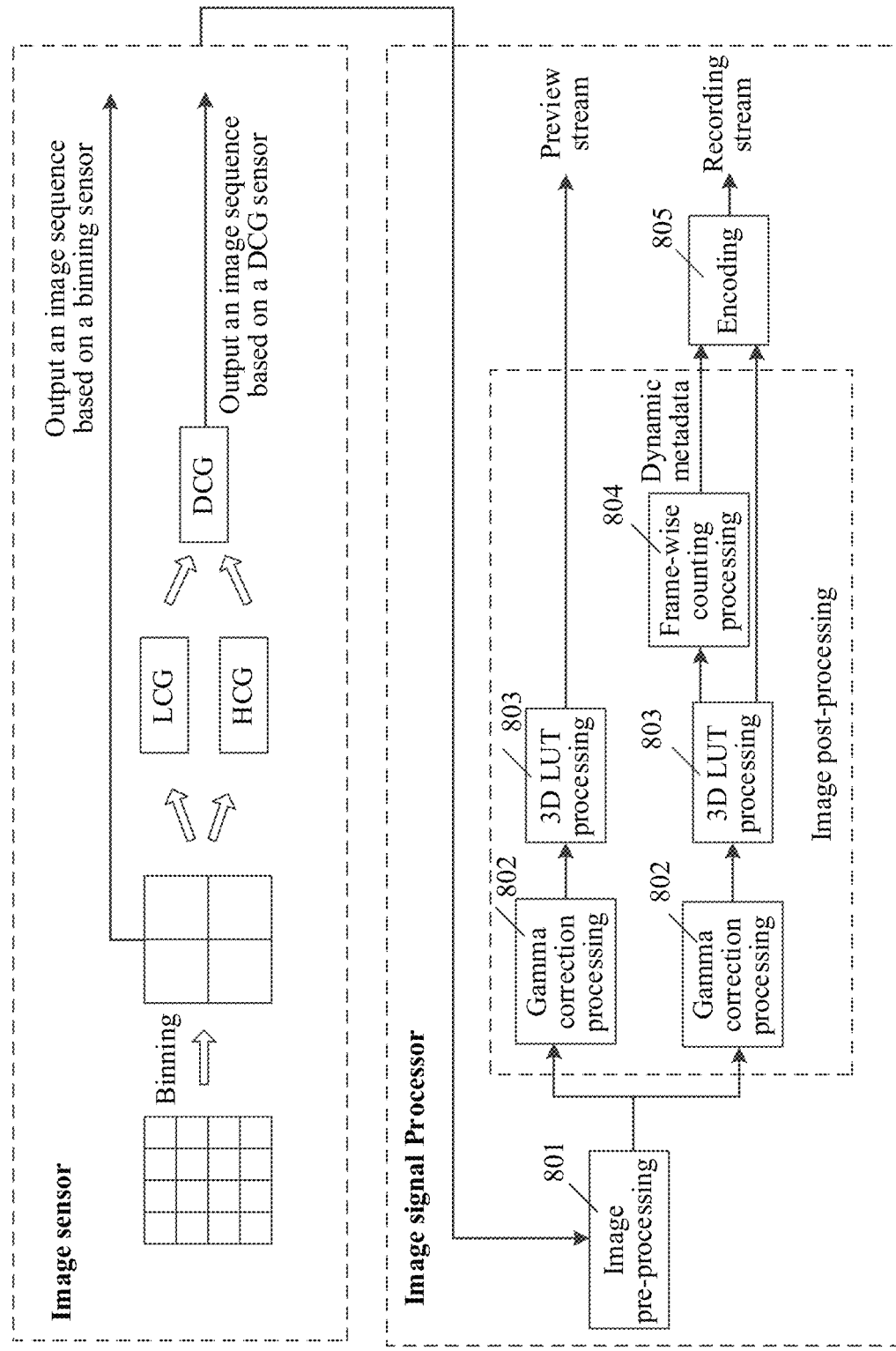
FIG. 8 is a schematic flowchart of a video processing method according to an embodiment of this application.

As an example, FIG. 8 is a schematic flowchart of a video processing method according to an embodiment of this application. As shown in FIG. 8, a camera of a first device may include an image sensor supporting an HDR function. For example, the image sensor may implement image output based on a DCG mode and image output based on a binning mode.

Image output data supported by the DCG mode may include a frame rate of 30 fps, a data storage supporting 12 bits bit, and an output format of RAW12. Image output data supported by the binning mode may include a frame rate of 30 fps, a data storage supporting 12 bits, and an output format of RAW12. It may be understood that, in the binning mode, data exists only in 10 most significant bits. Therefore, padding is required for two least significant bits, so as to ensure data storage of 12 bits.

As shown in FIG. 8, the image sensor may output image data based on the binning, or may output the image data based on a DCG. The binning may output the image sequence in a manner of synthesizing n (for example, n may be 4) pixels into one pixel. After the n pixels are synthesized into one pixel, the DCG may output the image sequence through image fusion based on HCG-based image output data and LCG-based image output data.

Further, in an image signal processor shown in FIG. 8, the first device may perform image preprocessing 801 on the image sequence, to obtain an image sequence after the image preprocessing 801.

In this embodiment of this application, the image preprocessing 801 (or referred to as an image signal processor front-end processing) is configured to process an image in a RAW format obtained through the camera into an image in a YUV (or understood as a brightness and a chrominance) format.

It may be understood that the image preprocessing 801 may include one or more of defect pixel correction, RAW domain noise reduction processing, black level correction processing, optical shadow correction processing, automatic white balance processing, color interpolation processing, color correction processing, tone mapping processing, image conversion processing, or the like. The image preprocessing 801 is not limited in this embodiment of this application.

Further, the first device may use the image sequence after the image preprocessing as the preview stream and the recording stream. In the preview stream, the first device may perform gamma (Gamma) correction processing 802 and 3D LUT processing 803 on the image sequence after the image preprocessing corresponding to the preview stream, to obtain the preview image sequence. In the recording stream, the first device may perform the gamma correction processing 802 and the 3D LUT processing 803 on the image sequence after the image preprocessing corresponding to the preview stream, to obtain a recording image sequence. The recording image sequence may include a first image sequence and a second image sequence described in the embodiments of this application.

During the gamma correction processing 802, the gamma correction processing is configured to adjust an image brightness, to retain more bright and dark details, compress a contrast, and retain more color information. As shown in FIG. 5A, FIG. 5B, FIG. 5C, and FIG. 5D, the first device may use a log curve to perform the gamma correction processing on the image sequence after the image preprocessing corresponding to the preview stream and the image sequence after the image preprocessing corresponding to the recording stream, to obtain an image sequence after the gamma correction processing corresponding to the preview stream and an image sequence after the gamma correction processing corresponding to the recording stream.

During the 3D LUT processing 803, the 3D LUT processing is configured to map a color space in the image, so that data after the 3D LUT have different color styles. As shown in FIG. 5A, FIG. 5B, FIG. 5C, and FIG. 5D, the first device performs 3D LUT color mapping on the image sequence after the gamma correction processing corresponding to the preview stream and the image sequence after the gamma correction processing corresponding to the recording stream, to obtain the preview image sequence corresponding to the preview stream and the recording image sequence corresponding to the recording stream.

It may be understood that all images in the preview image sequence and the recording image sequence may be images satisfying a PQ curve of a BT.2020 color gamut. A reference brightness supported in the PQ curve is 1000 nits, and the PQ curve may be stored in the first device as static metadata. A format of the static metadata may satisfy SMPTE ST 2086 or another custom format. A specific format of the static metadata is not specifically limited in this embodiment of this application.

It may be understood that the gamma correction processing 802 and the 3D LUT processing 803 may be a part of image post-processing (or referred to as image processor back-end processing).

In a possible implementation, the image post-processing may further include anti-shake processing, noise processing, image scaling processing, and another processing step, which is not limited in this embodiment of this application.

Further, the first device performs frame-wise counting processing 804 on the images in the preview image sequence, determines tone mapping curves respectively corresponding to the plurality of frames of images in the recording image sequence, and generates dynamic metadata, so that the first device may perform encoding by using the recording image sequence and the dynamic metadata to obtain an HDR10+ video. The first device may perform encoding based on the recording image sequence and the dynamic metadata to obtain the HDR10+ video when receiving an operation of ending video recording performed by a user in a movie mode.

Figure 9:
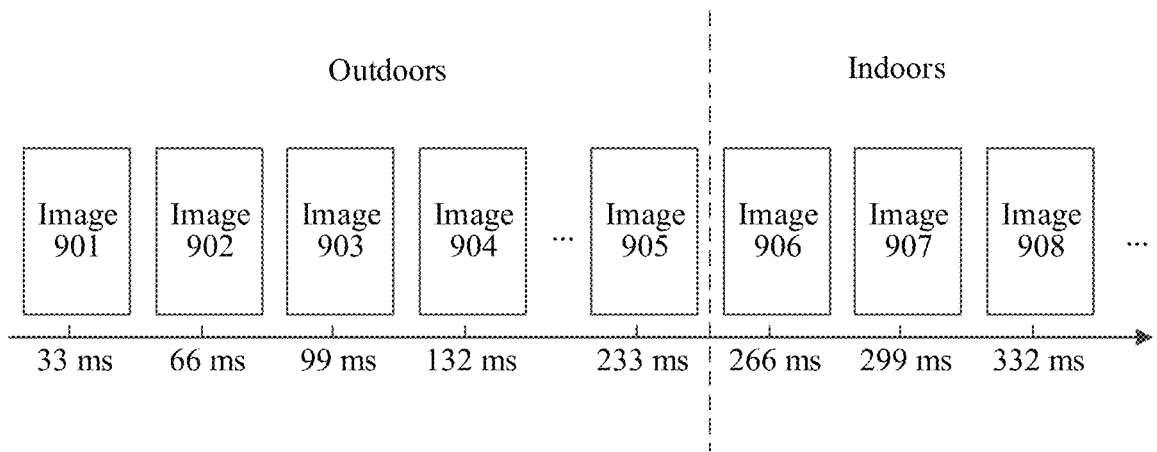
FIG. 9 is a schematic diagram of an image sequence and a brightness scene according to an embodiment of this application.

As an example, FIG. 9 is a schematic diagram of an image sequence and a brightness scene according to an embodiment of this application. In an embodiment corresponding to FIG. 9, brightness scenes of a plurality of frames of images generated within 1 second (s) are described by using a frame rate of 30 fps as an example.

As shown in FIG. 9, the first device may obtain an image 901 at about 33 milliseconds (ms), obtain an image 902 at about 66 ms, obtain an image 903 at about 99 ms, obtain an image 904 at about 132 ms, . . . , obtain an image 905 at about 233 ms, obtain an image 906 at about 266 ms, obtain an image 907 at about 299 ms, obtain an image 908 at about 332 ms, and the like.

For example, the user may obtain the image 901, the image 902, the image 903, the image 904, . . . , and the image 905 outdoors. When the user moves from outdoors to indoors, the user may obtain the image the image 906, the image 907, the image 908, and the like indoors.

It may be understood that in the image frame obtained by the user outdoors, a brightness scene where the image 901 is located may be the same as a brightness scene where the image 902 is located. For example, the image 901 and the image both 902 both may be in a high brightness scene. Alternatively, the brightness scene where the image 901 is located may be different from the brightness scene where the image 902 is located. For example, the image 901 may be in a high brightness scene, and the image 902 may be in a moderate brightness scene. Therefore, the first image sequence described in the embodiments of this application may be an image frame at a specific time. For example, the first image sequence may be the image 901, or the first image sequence may be a collective name of image frames in a specific period of time. For example, the first image sequence may include the image 901, the image 902, the image 903, the image 904, . . . , and the image 905. Similarly, the second image sequence described in the embodiments of this application may also be an image frame at a specific time. For example, the second image sequence may be the image 906, or the second image sequence may be a collective name of image frames in a specific period of time. For example, the second image sequence may include the image 906, the image 907, and the image 908. A brightness scene corresponding to the first image sequence is different from a brightness scene corresponding to the second image sequence.

In this embodiment of this application, the tone mapping curve may adjust a brightness of a region in the image based on the reference brightness, to protect highly bright and dark regions in the image, for example, to improve the dark region in the image and to suppress the highly bright region in the image. The reference brightness of the tone mapping curve may be preset. For example, the reference brightness of the preset may be set to 400 nits or another value.

During the frame-wise counting processing 804, a process of determining tone mapping curves corresponding to the plurality of frames of images in the recording image sequence by the first device may be as follows: The first device may determine brightness scenes respectively corresponding to the plurality of frames of images in the recording image sequence, and then determine the tone mapping curves corresponding to the brightness scenes based on a correspondence between a brightness scene and a tone mapping curve.

It may be understood that the brightness scenes may include a high brightness scene, a moderate brightness scene, a low brightness scene, and the like. The brightness scenes are not limited to the three types, and may be four, five, or six types. Names and a quantity of scenes included in the brightness scenes are not limited in this embodiment of this application.

Specifically, the first device may determine the brightness scenes respectively corresponding to the plurality of frames of images in the recording image sequence based on a grayscale histogram of the preview image, an average brightness value of the preview image, and the like.

In an implementation, the first device may store a grayscale histogram corresponding to a typical brightness scene. Therefore, the first device may respectively calculate grayscale histograms corresponding to the plurality of frames of images in the recording image sequence. If a similarity between the grayscale histogram of the preview image and the grayscale histogram corresponding to the typical brightness scene is greater than a specific threshold, the first device may determine the brightness scene corresponding to the preview image. The grayscale histogram indicates brightness distribution of pixel points in the preview image. The brightness may be understood as a value (or a Y component) corresponding to a Y channel when the image is in a YUV format.

In another implementation, the first device may respectively calculate average brightness values of the pixel points in the plurality of frames of images in the recording image sequence. If the average brightness value is greater than a brightness threshold corresponding to the brightness scene, the first device may determine the brightness scene corresponding to the preview image.

It may be understood that the method for determining the brightness scenes corresponding to the plurality of frames of images in the recording image sequence by the first device may not be limited to the above two methods. This is not limited in this embodiment of this application.

Further, during the frame-wise counting processing 804, when the first device determines the brightness scenes respectively corresponding to the plurality of frames of images in the recording image sequence, the first device may determine the tone mapping curves corresponding to the brightness scenes based on the correspondence between a brightness scene and a tone mapping curve, to generate dynamic metadata.

Specifically, the first device may store the correspondence between a brightness scene and a tone mapping curve, and thus the first device may obtain a tone mapping curve corresponding to a current brightness scene from the correspondence through matching to obtain the dynamic metadata. Alternatively, the first device may determine a corresponding tone mapping curve in real time based on a brightness scene to generate the dynamic metadata. The dynamic metadata may include a reference brightness value of the tone mapping curve, for example, 400 nits.

It may be understood that the tone mapping curve may be stored in the first device in the form of dynamic metadata. The format of the dynamic metadata may vary depending on a protocol. For example, the format of the dynamic metadata may satisfy SMPTE ST 2094 (which supports application1, application2, application3, or application4), or another customized format. The specific format of the dynamic metadata is not specifically limited in this embodiment of this application. For example, the dynamic metadata specified in SMPTE ST 2094-application4 may include one or more of the following: information about a window in an image (the widow may be a rectangular area arranged in the image), a size and a position of the window, an RGB value of a brightest pixel in the window, a maximum average value in R, G, and B of pixels in the window, a percentage level of a brightness in the window, a level (a percentile) of the brightness in the window, a degree of a maximum brightness value of a scene, a brightness value of an inflection point (which may be understood as a point where the brightness loses linearity), a sample with a brightness exceeding the inflection point, an RGB value for correcting a change during brightness compression performed on a target display, a brightness of the target display (or may be referred to as a preset brightness described in the embodiments of this application), a brightness of a local display, and the like. It may be understood that preset brightnesses in the dynamic metadata are the same. For example, when the dynamic metadata includes first dynamic metadata and second dynamic metadata, a preset brightness in the first dynamic metadata is the same as a preset brightness in the second dynamic metadata.

Further, during encoding 805, the first device displays an HDR10 video by using the preview image sequence, and performs encoding by using the recording image sequence and the dynamic metadata to obtain a first HDR10+ video.

In this embodiment of this application, the HDR10 video may be used for preview display of the first device. For example, the HDR10 video may be displayed on a display of the first device. The first HDR10+ video may be used for video recording by the first device. For example, the first device may send the recording image sequence and the dynamic metadata to a video encoder based on a timestamp (or based on an identifier indicates that the recording image sequence and the dynamic metadata belong to a pair of data), to obtain the first HDR10+ video through encoding. The first HDR10+ video may be stored in the first device, and the first HDR10+ video may be displayed on the first device (or the second device) based on a playback operation performed by the user.

Based on the above, the first device may match different dynamic metadata for different brightness scenes corresponding to a plurality of frames of images obtained based on a camera, and adjust the plurality of frames of images by using the different dynamic metadata, to obtain an HDR10+ video.

Based on the embodiment corresponding to FIG. 8 in which the first device obtains the HDR10+ video through encoding, the first device may store the HDR10+ video in a photos application.

Figure 10A:
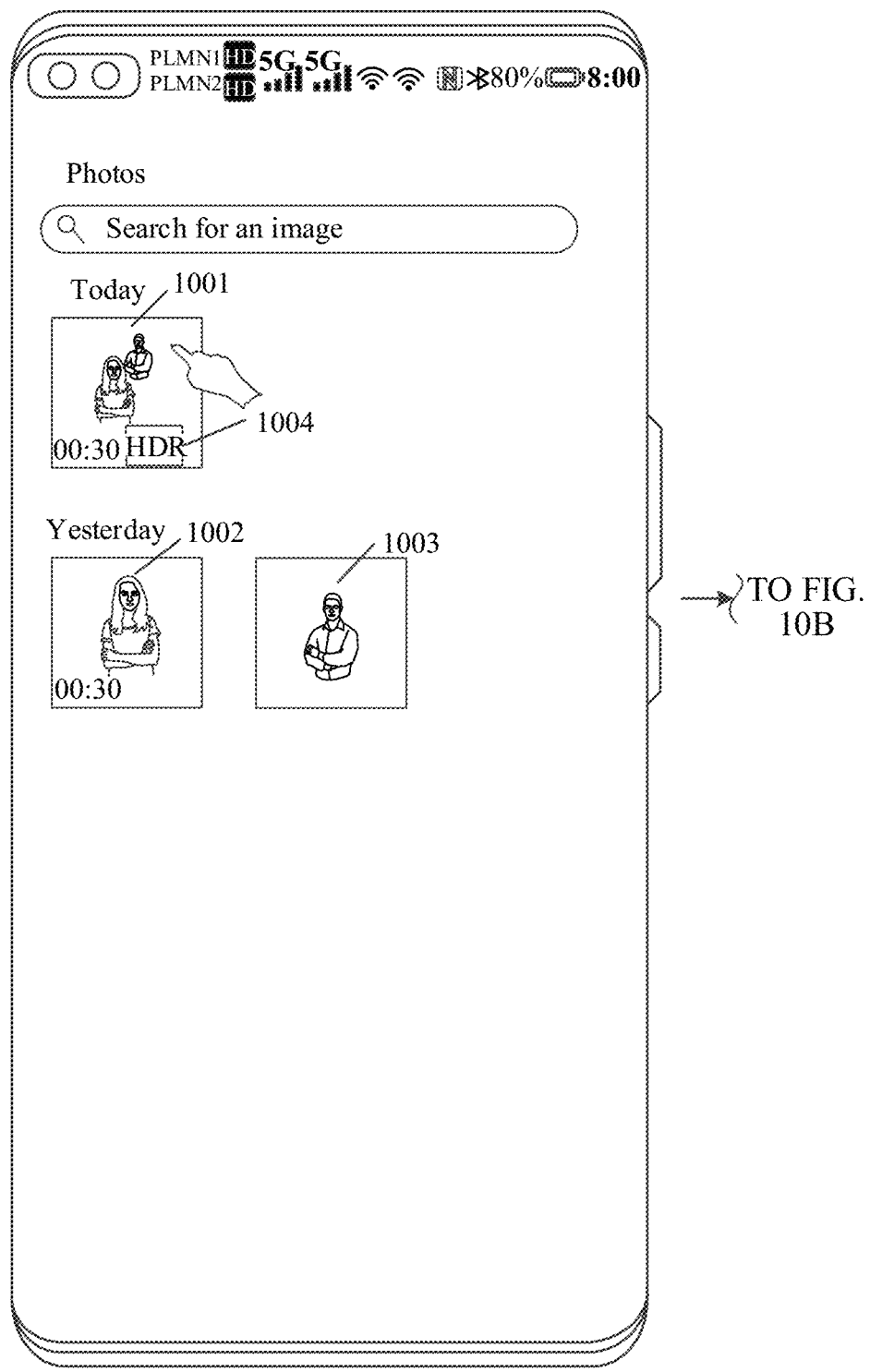
FIG. 10A and FIG. 10B are schematic diagrams of an interface of viewing an HDR10+ video according to an embodiment of this application.
Figure 10B:
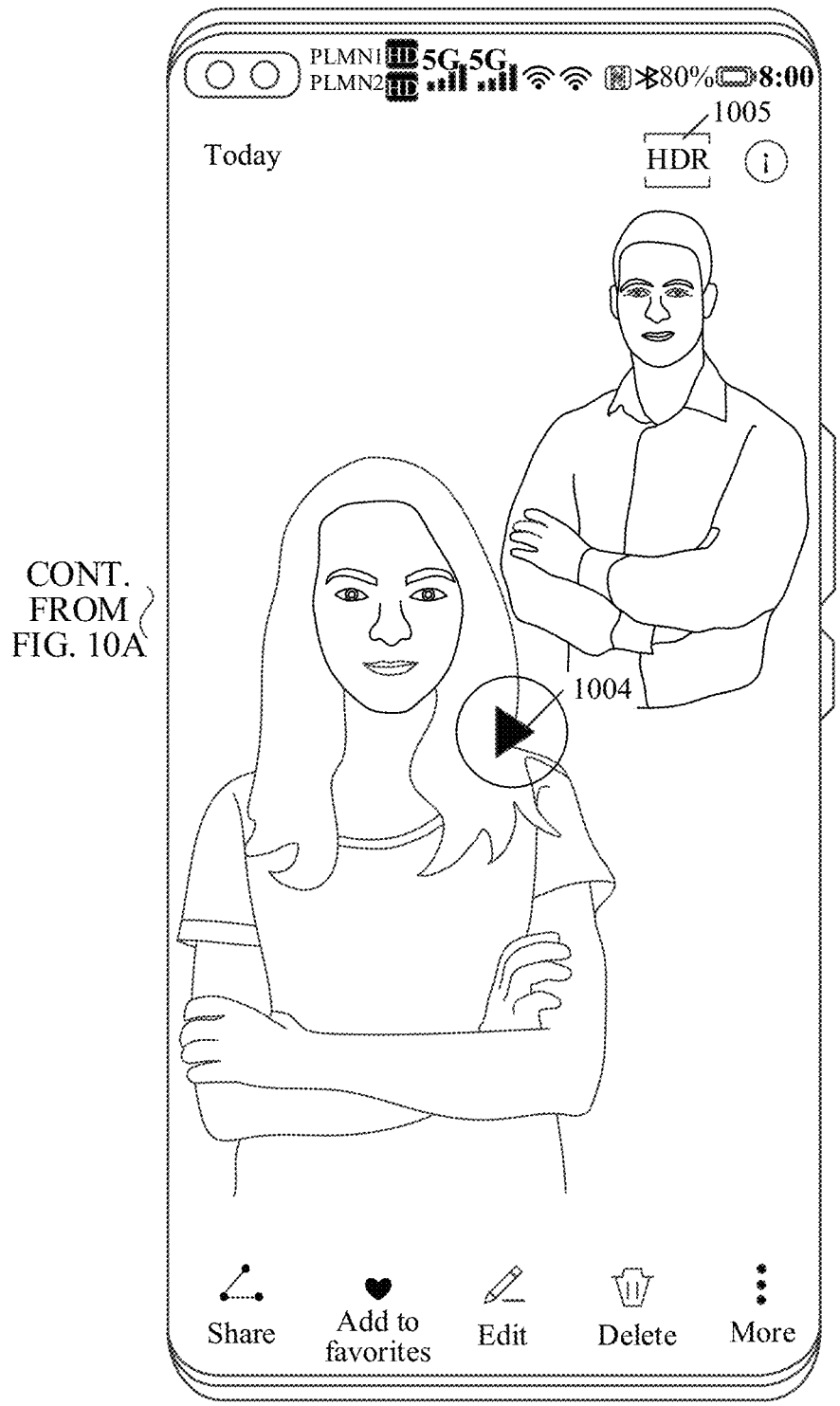

As an example, FIG. 10A and FIG. 10B are schematic diagrams of an interface of viewing an HDR10+ video according to an embodiment of this application.

When the first device receives an operation of enabling the photos application performed by the user, the first device may display an interface shown in FIG. 10A. The interface may display a video 1001 recorded today and a video 1002 and an image 1003 recorded yesterday. An identifier 1004 indicating that the video 1001 is an HDR10+ video may be displayed around the video 1001. The identifier 1004 may be displayed as an HDR.

Further, in the interface shown in FIG. 10A, when the first device receives an operation of triggering the video 1001 performed by the user, the first device may display an interface shown in FIG. 10B. The interface shown in FIG. 10B may include an identifier 1005 indicating that the video 1001 is an HDR10+ video, a control for viewing more information about the video, a control for sharing the video, a control for adding the video to favorites, a control for editing the video, a control for deleting the video, a control for viewing more functions, and the like.

Based on the above, the user may accurately find the HDR10+ video in a photos application based on the identifier, thereby improving convenience of viewing the HDR10+ video by the user.

Based on the embodiment corresponding to FIG. 10A and FIG. 10B, when the first device receives an operation of sharing the HDR10+ video performed by the user, the first device may share the HDR10+ video to the second device.

In this embodiment of this application, the operation of sharing the HDR10+ video performed by the user may be an operation of sharing the HDR10+ video performed by the user through Bluetooth, an operation of sharing the HDR10+ video performed by the user through a network such as WLAN, or an operation of sharing the HDR10+ video to another device through device sharing. The sharing operation is not specifically limited in this embodiment of this application.

Figure 11A:
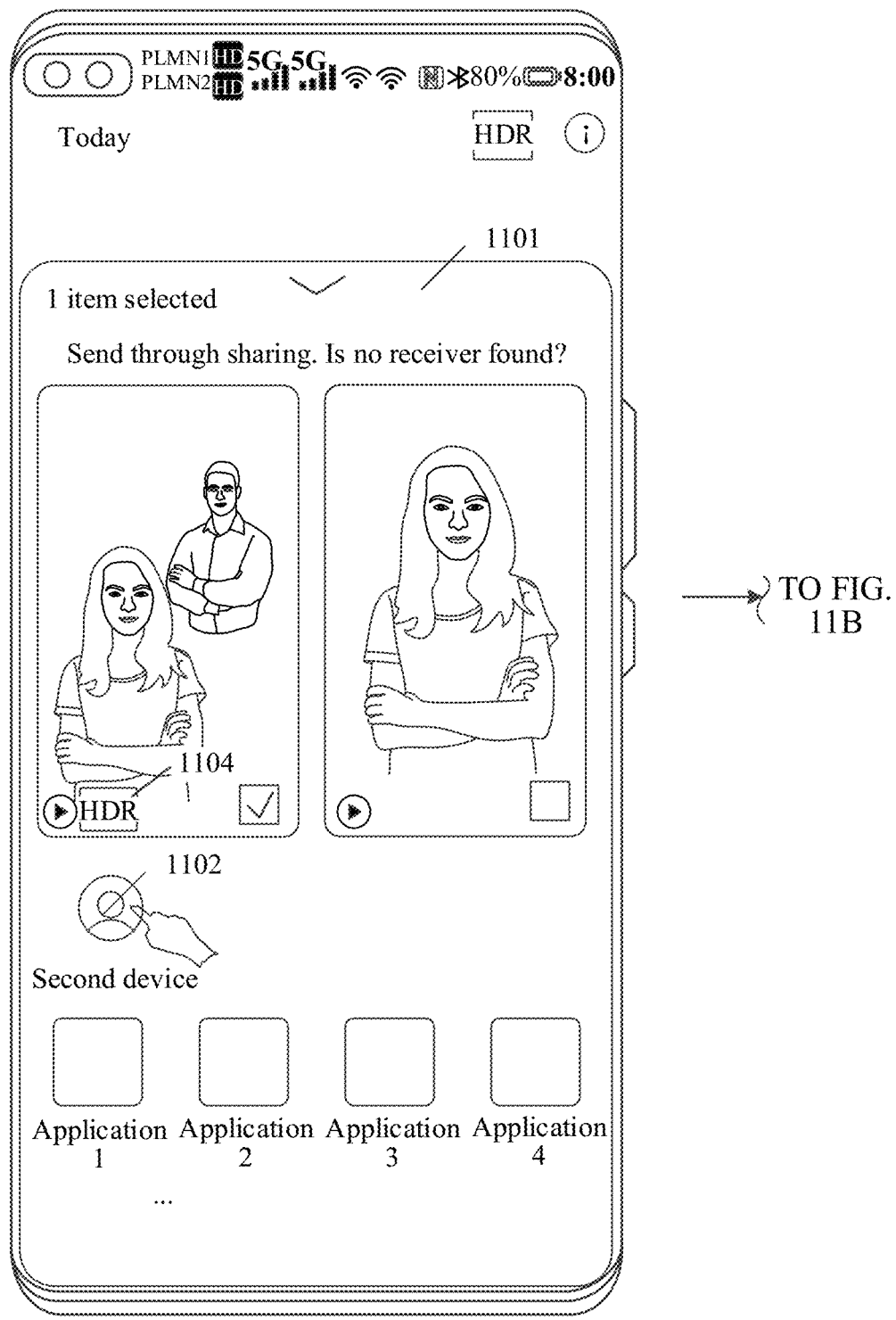
FIG. 11A and FIG. 11B are schematic diagrams of a device sharing interface according to an embodiment of this application.
Figure 11B:
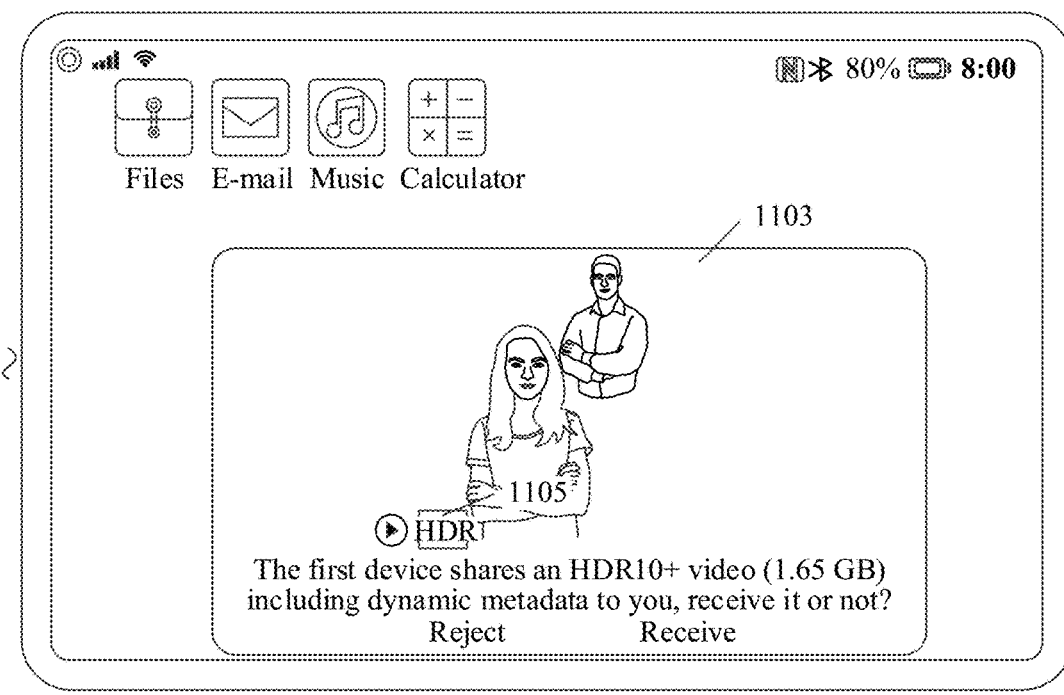

For example, the sharing operation may be "Honor sharing", that is, a sharing manner of performing device scanning through Bluetooth and performing data transmission through the WLAN. FIG. 11A and FIG. 11B are schematic diagrams of an interface of device sharing according to an embodiment of this application.

When the first device receives the operation of sharing the HDR10+ video performed by the user, for example, receiving an operation performed by the user on the control for sharing the video in the interface shown in FIG. 10B, the first device may display the interface shown in FIG. 11A. The interface may include prompt information 1101. The prompt information 1101 may include a control 1102 for sharing the HDR10+ video to the second device. It may be understood that the prompt information 1101 may further include a content such as a control for sharing the HDR10+ video to another application.

In a possible implementation, as shown in FIG. 11A, an identifier 1104 indicating the HDR10+ video may be displayed around the HDR10+ video. For example, the identifier may be an HDR.

In the interface shown in FIG. 11A, when the first device receives an operation performed by the user on the control 1102, the first device may share the HDR10+ video to the second device, and the second device may display an interface shown in FIG. 11B. As shown in FIG. 11B, the interface of the second device may display prompt information 1103. The prompt information 1103 indicates that the received HDR10+ video is generated based on the dynamic metadata. For example, the prompt information 1103 may be displayed as: the first device shares an HDR10+ video (1.65 GB) including dynamic metadata, receive it or not? The prompt information may include a rejection control, a receiving control, and the like. The interface shown in FIG. 11B may further include a file management application control, an email application control, a music application control, a computer application control, and the like.

In a possible implementation, as shown in FIG. 11B, an identifier 1105 indicating the HDR10+ video may be displayed around the HDR10+ video. For example, the identifier may be an HDR.

In the interface shown in FIG. 11B, when the second device receives an operation performed by the user on the receiving control, the second device may store the HDR10+ video.

Based on the above, the first device may share the HDR10+ video to the second device through device sharing, so that the second device may play the HDR10+ video on the device.

Based on the embodiment corresponding to FIG. 11A and FIG. 11B, in a possible implementation, when the second device receives an operation of playing the HDR10+ video performed by the user, the second device may display prompt information. The prompt information indicates that the second device plays the HDR10+ video based on the dynamic metadata.

Figure 12:
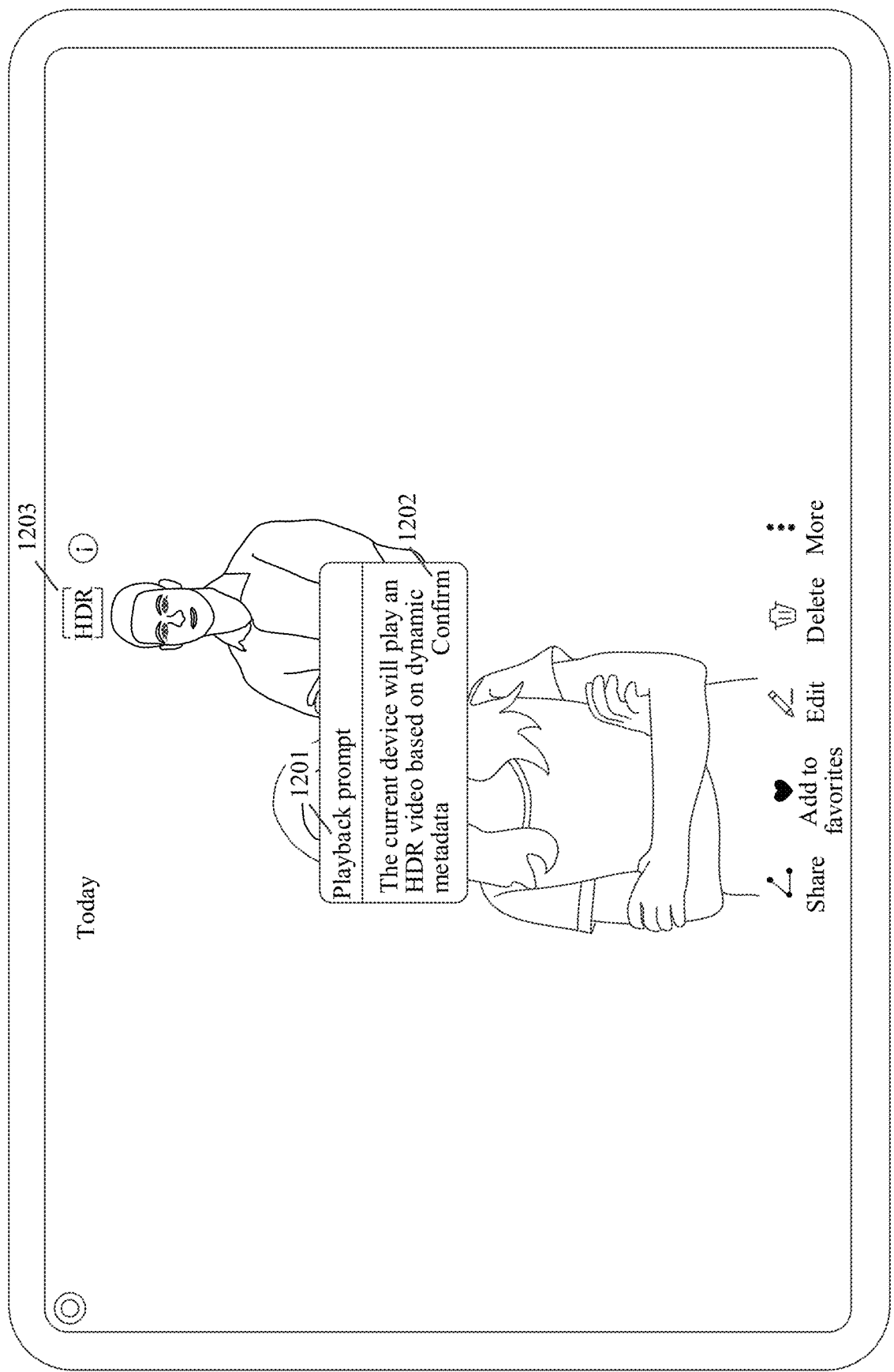
FIG. 12 is a schematic diagram of an interface of displaying prompt information according to an embodiment of this application.

As an example, FIG. 12 is a schematic diagram of an interface of displaying prompt information according to an embodiment of this application. When the second device receives the operation of playing the HDR10+ video performed by the use, the second device may display an interface shown in FIG. 12. The interface may include prompt information 1201, a confirmation control 1202, a control for ending playback of the HDR10+ video, a control for enabling the photos application, a control for viewing more functions, and the like. The prompt information 1201 indicates a playback format of the current video. For example, the prompt information 1201 may be displayed as: the current device plays the HDR video based on the dynamic metadata.

In a possible implementation, in the interface shown in FIG. 12, an identifier 1203 indicating the HDR10+ video may be displayed around the HDR10+ video. For example, the identifier may be an HDR.

In a possible implementation, when the second device does not support the dynamic metadata, the second device may play the video based on the static metadata. In this case, the second device may not display the prompt information 1201.

Further, in the interface shown in FIG. 12, when the second device receives an operation performed by the user on the confirmation control 1202, the second device may parse and play the HDR10+ video. For example, the second device may parse and play the HDR10+ video based on a video processing process in an embodiment corresponding to FIG. 13.

Figure 13:
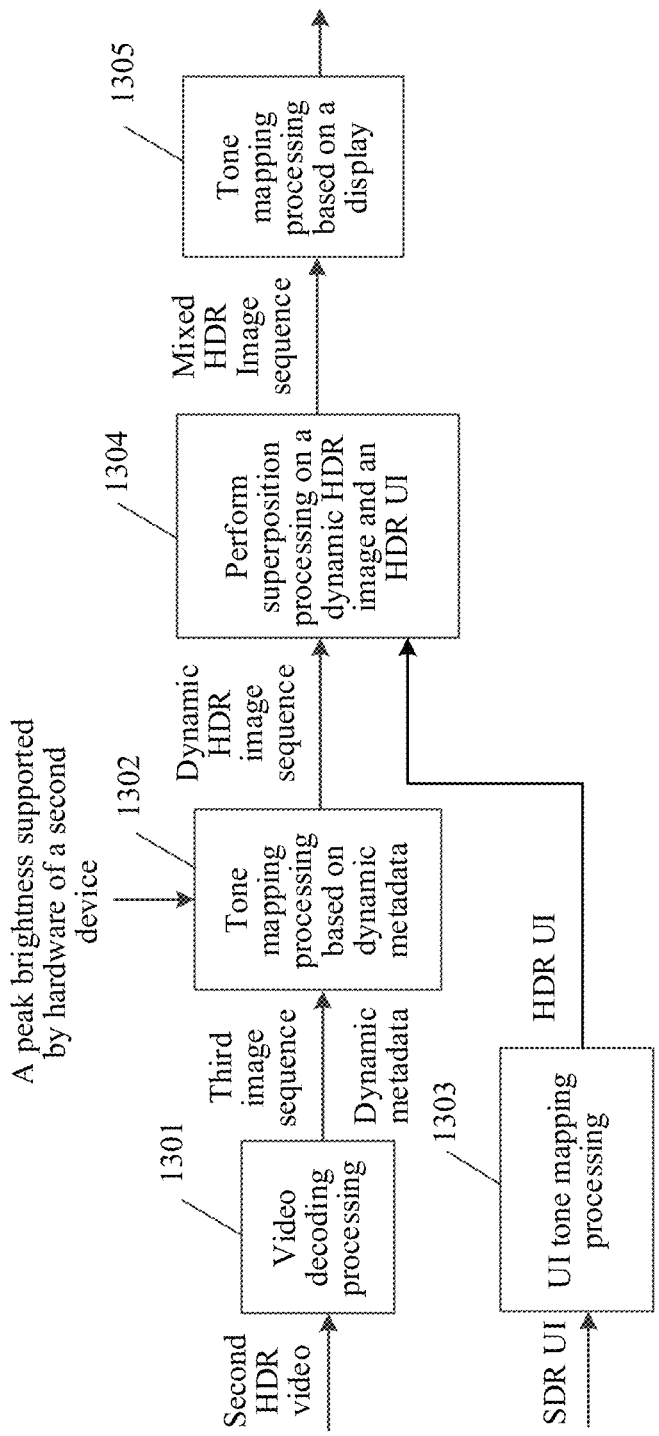
FIG. 13 is a schematic flowchart of playing an HDR10+ video according to an embodiment of this application.

As an example, FIG. 13 is a schematic flowchart of playing an HDR10+ video according to an embodiment of this application. As shown in FIG. 13, a process of playing the HDR10+ video may include video decoding processing 1301. During the video decoding processing 1301, the second device may decode the HDR10+ video into the dynamic metadata and a third image sequence based on a video standard of SMPTE ST 2094-application4.

In this embodiment of this application, when the second device receives the first HDR10+ video sent by the first device, the second device may determine a video standard of the first HDR10+ video, for example, whether the first HDR10+ video supports SMPTE ST 2094-application4, SMPTE ST 2086, or the like. Further, when the second device supports the video standard of SMPTE ST 2094-application4, the second device may obtain the dynamic metadata and the third image sequence (which may be an HDR static image) through decoding of the first HDR10+ video. Alternatively, when the second device supports the video standard of SMPTE ST 2086, the second device may obtain the static metadata and the third image sequence through the decoding of the first HDR10+ video.

As shown in FIG. 13, when the second device supports the dynamic metadata, the process of playing the HDR video may include steps such as tone mapping processing 1302 based on the dynamic metadata, user interface (user interface, UI) tone mapping processing 1303, superposition processing 1304 for a dynamic HDR image and an HDR UI, and color tone mapping processing 1305 based on a display.

During the tone mapping processing 1302 based on the dynamic metadata, the second device may perform tone mapping on each frame of image of the third image sequence based on corresponding dynamic metadata thereof according to SMPTE ST 2094-application4, to obtain an image sequence after the tone mapping. Further, the second device may alternatively adjust brightnesses of images in the image sequence after the tone mapping based on the peak brightness supported by the hardware of the second device. For example, the brightnesses of the images in the image sequence after the tone mapping may be proportionally adjusted based on a ratio relationship between the reference brightness (for example, 400 nits) of the dynamic metadata and the peak brightness (for example, 500 nits) supported by the hardware of the second device, to obtain a dynamic HDR image sequence.

During the UI tone mapping processing 1303, the second device may adjust a tone of a standard dynamic range (standard dynamic range, SDR) UI icon based on a preset tone mapping rule, to obtain an HDR UI.

During the superposition processing 1304 for the dynamic HDR image and the HDR UI, the second device may superpose each frame of image of the dynamic HDR image sequence with the HDR UI, to obtain a mixed HDR image sequence.

During the color tone mapping processing 1305 based on a display, the second device may process, based on tone mapping of the display, images in the mixed HDR image sequence into an image sequence displaying a color space, to obtain the HDR10+ video.

In a possible implementation, when it is determined that the second device supports the static metadata, the second device may generate the HDR10 video by using the third image sequence and the static metadata. It may be understood that the second device may alternatively obtain the HDR10 video by using the static metadata and the third image sequence based on the embodiment corresponding to FIG. 13. Details are not described herein.

Based on the above, the second device may implement decoding and playback of the HDR10+ video sent by the first device.

It may be understood that the interface provided in this embodiment of this application is merely an example, and does not constitute a further limitation on the embodiments of this application.

Figure 14:
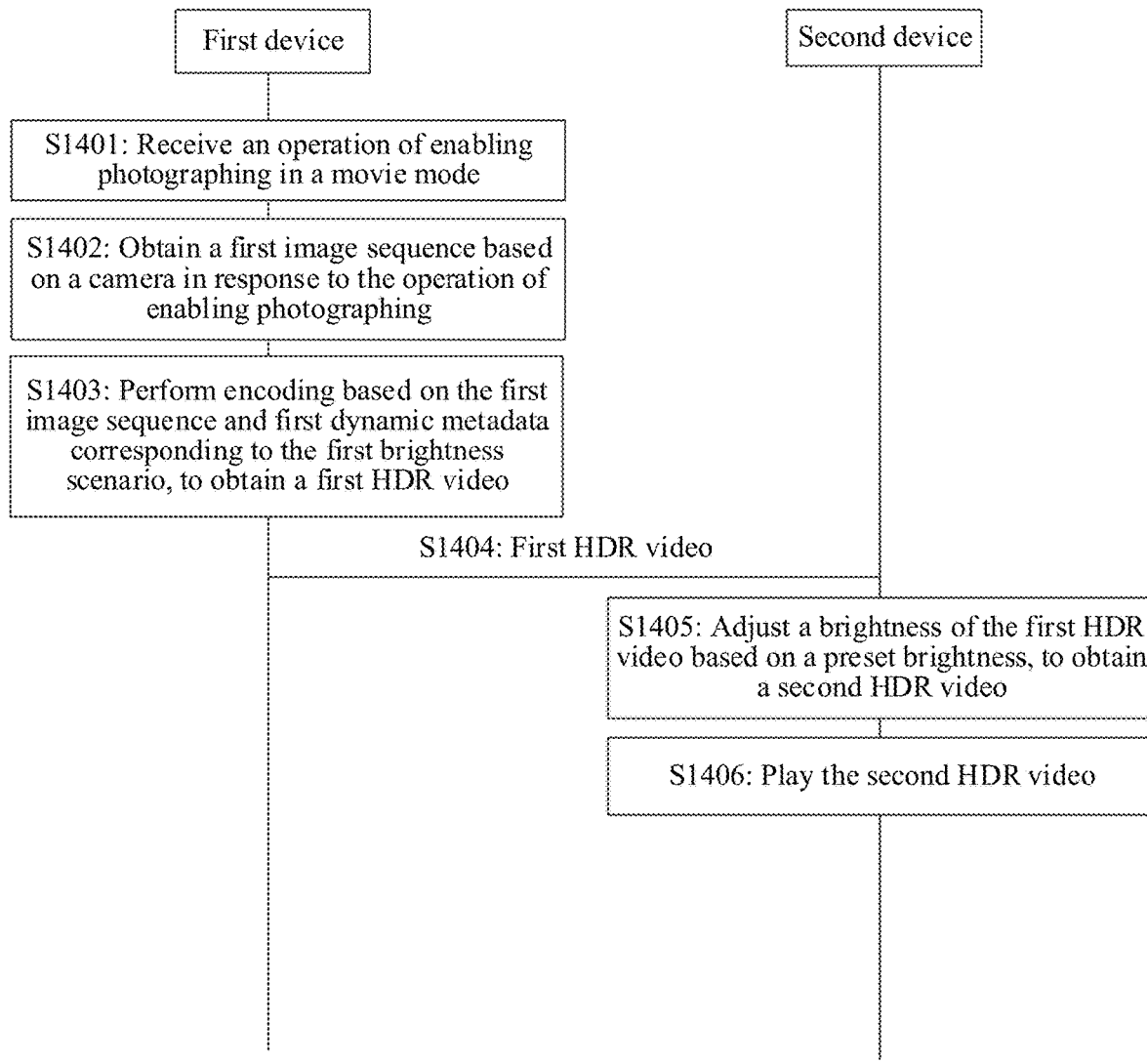
FIG. 14 is a schematic flowchart of another video processing method according to an embodiment of this application.

In order to describe the content in the above embodiments more clearly, as an example, FIG. 14 is a schematic flowchart of another video processing method according to an embodiment of this application.

As shown in FIG. 14, the video processing method may include the following steps:

S1401: A first device receives an operation of enabling photographing in a movie mode.

In this embodiment of this application, the movie mode is a mode for recording a high dynamic range HDR video. The operation of enabling photographing may be the operation for the control 503 for enabling photographing in the embodiment corresponding to FIG. 5A, FIG. 5B, FIG. 5C, and FIG. 5D, or may be the operation for the control 602 for enabling photographing in the embodiment corresponding to FIG. 6A, FIG. 6B, and FIG. 6C.

S1402: The first device obtains a first image sequence based on a camera in response to the operation of enabling photographing.

The first image sequence corresponds to a first brightness scene. For a method for determining the first brightness scene, refer to the description in the embodiment corresponding to FIG. 8, and the details are not described herein.

S1403: The first device performs encoding based on the first image sequence and first dynamic metadata corresponding to the first brightness scene, to obtain a first HDR video.

The first HDR video may be the first HDR10+ video described in the embodiments of this application. The first dynamic metadata includes a preset brightness.

S1404: A second device obtains the first HDR video from the first device.

For example, the second device may obtain the first HDR video from the first device based on the embodiment corresponding to FIG. 11A and FIG. 11B.

In a possible implementation, the first HDR video may be compatible with both dynamic metadata and static metadata, so that the second device supporting dynamic metadata may play a content in the first HDR video by using the dynamic metadata, or the second device supporting static metadata may play the content in the first HDR video by using the static metadata.

S1405: The second device adjusts a brightness of the first HDR video based on the preset brightness, to obtain a second HDR video.

The second HDR video may be the second HDR10+ video described in the embodiments of this application. For example, when the dynamic metadata corresponding to the first HDR video indicates that a preset brightness of the first HDR video is 400 nits, the second device may adjust images in the first HDR video based on 400 nits, so that brightnesses of the images in the first HDR video are all maintained at a maximum of 400 nits.

In a possible implementation, when the dynamic metadata corresponding to the first HDR video indicates that the preset brightness of the first HDR video is 400 nits and a peak brightness of the second device is 700 nits, the second device may adaptively increase the brightnesses of the images in the first HDR video based on a ratio relationship between 400 nits and 700 nits, so that all images in the first HDR video of 400 nits may be displayed on a display of the second device of 700 nits.

S1406: The second device plays the second HDR video.

The second device may play the second HDR video based on the embodiment corresponding to FIG. 12.

Based on the above, the first device may obtain the first image sequence based on the camera, match dynamic metadata for the brightness scene corresponding to the first image sequence, adjust the brightness scene corresponding to the first image sequence by using the dynamic metadata to obtain the first HDR video, and send the first HDR video to the second device, so that the second device may perform brightness mapping on the first HDR video based on the preset brightness indicated in the dynamic metadata, and display a video content with an appropriate brightness.

In a possible implementation, the second device adjusts the brightness of the first HDR video based on the preset brightness, to obtain the second HDR video. S1406 includes: determining, by the second device, a brightness ratio, where the brightness ratio is a ratio between a peak brightness of the second device and the preset brightness; and adjusting, by the second device, the brightness of the first HDR video based on the brightness ratio, to obtain the second HDR video.

In a possible implementation, the method further includes: further obtaining, by the first device, a second image sequence based on the camera, where the second image sequence corresponds to a second brightness scene, and the first brightness scene is different from the second brightness scene. That the first device performs encoding based on the first image sequence and first dynamic metadata corresponding to the first brightness scene, to obtain the first HDR video includes: performing, by the first device, encoding based on the first image sequence, the second image sequence, the first dynamic metadata corresponding to the first brightness scene, and second dynamic metadata corresponding to the second brightness scene, to obtain the first HDR video.

In a possible implementation, before S1403, the method further includes: performing, by the first device, image preprocessing on the first image sequence, to obtain a first image sequence after the image preprocessing; performing, by the first device, gamma correction processing on the first image sequence after the image preprocessing, to obtain a first image sequence after the gamma correction processing; performing, by the first device, 3D look up table processing on the first image sequence after the gamma correction processing, to obtain a first image sequence after the 3D look up table processing, where the first image sequence after the 3D look up table processing includes first static metadata corresponding to the first image sequence. That the first device performs encoding based on the first image sequence and first dynamic metadata corresponding to the first brightness scene, to obtain the first HDR video includes: performing, by the first device, encoding based on the first image sequence after the 3D look up table processing and the first dynamic metadata corresponding to the first brightness scene, to obtain the first HDR video.

For the steps such as the image preprocessing, the gamma correction processing, and the 3D look up table processing, refer to the descriptions in the embodiment corresponding to FIG. 8, and the details are not described herein.

In a possible implementation, the first HDR video includes first static metadata and the first dynamic metadata.

In a possible implementation, the method further includes: decoding, by the second device, the second HDR video into the first image sequence and the first static metadata when it is determined that the second device supports processing of the first static metadata; and performing, by the second device, encoding based on the first image sequence and the first static metadata, to obtain a third HDR video, where the second HDR video is different from the third HDR video.

In a possible implementation, a type of the first HDR video is an HDR10+ video, a type of the second HDR video is the HDR10+ video, and a type of the third HDR video is an HDR10 video.

In a possible implementation, S1401 includes receiving, by the first device, an operation of enabling the movie mode; displaying, by the first device, a first interface in response to the operation of enabling the movie mode, where the first interface includes a control for recording the HDR video and a control for enabling photographing; receiving, by the first device, an operation of enabling the control for recording the HDR video when the control for recording the HDR video is in a disabled state; displaying, by the first device, a second interface in response to the operation for the control for recording the HDR video, where the second interface includes prompt information indicating that a 4K HDR10+ mode is enabled; and receiving, by the first device, an operation for the control for enabling photographing when the control for recording the HDR video is in an enabled state.

The operation of enabling the movie mode may be the operation for the control 501 for enabling the movie mode in the interface shown in a in 5. The first interface may be the interface shown in FIG. 5B. The control for recording the HDR video may be the 4K HDR function control 502 shown in FIG. 5B. The control for enabling photographing may be the control 503 for enabling photographing shown in FIG. 5B. The second interface may be the interface shown in FIG. 5C. The prompt information indicating that the 4K HDR10+ mode is enabled may be the prompt information 505 shown in FIG. 5C.

In a possible implementation, the method further includes: receiving, by the first device, an operation of disabling the control for recording the HDR video when the control for recording the HDR video is in the enabled state; and displaying, by the first device, a third interface in response to the operation for the control for recording the HDR video, where the third interface includes prompt information indicating that the 4K HDR10+ mode is disabled.

The third interface may be the interface shown in FIG. 5D. The prompt information indicating that the 4K HDR10+ mode is disabled may be the prompt information 506 shown in FIG. 5D.

In a possible implementation, the method further includes: receiving, by the first device, an operation of enabling the movie mode for a first time; and displaying, by the first device, a fourth interface in response to the operation of enabling the movie mode for the first time, where the fourth interface includes the control for recording the HDR video and prompt information indicating that a 4K HDR10+ video is recorded after the control for recording the HDR video is enabled.

The fourth interface may be the interface shown in FIG. 5B. The control for recording the HDR video may be the prompt information 504 shown in FIG. 5B.

In a possible implementation, the receiving, by the first device, an operation of enabling photographing in a movie mode includes: receiving, by the first device, an operation of enabling the movie mode; displaying, by the first device, a fifth interface in response to the operation of enabling the movie mode, where the fifth interface includes a control for viewing settings corresponding to a first application and a control for enabling photographing; receiving, by the first device, an operation for the control for viewing the settings corresponding to the first application; displaying, by the first device, a sixth interface in response to the operation for the control for viewing the settings corresponding to the first application, where the sixth interface includes a first control for recording a video with a 10-bit HDR in the movie mode and switching the video to 4K; receiving, by the first device, the operation for the control for enabling photographing when the first control is in an enabled state.

The fifth interface may be the interface shown in FIG. 6A. The control for viewing the settings corresponding to the first application may be the setting control 601 shown in FIG. 6A. The control for enabling photographing may be the control 602 for enabling photographing shown in FIG. 6A. The sixth interface may be the interface shown in FIG. 6B. The first control may be the movie HDR function control 603 shown in FIG. 6B.

In a possible implementation, the method further includes: receiving, by the first device, an operation for a control for viewing function details in the first application; and displaying, by the first device, a seventh interface in response to the operation for the control for viewing the function details in the first application, where the seventh interface includes function details corresponding to the movie mode, and the function details corresponding to the movie mode indicate that a 4K HDR10+ video is allowed to be recorded in the movie mode.

The seventh interface may be the interface shown in FIG. 7C. The function details corresponding to the movie mode may be the detailed description 703 corresponding to the movie mode shown in FIG. 7C.

In a possible implementation, the method further includes: receiving, by the first device, an operation of enabling a second application; displaying, by the first device, an eighth interface in response to the operation of enabling the second application, where the eighth interface includes the first HDR video and an identifier corresponding to the first HDR video, and the identifier indicates a type of the first HDR video; receiving, by the first device, an operation for the first HDR video; and displaying, by the first device, a ninth interface in response to the operation for the first HDR video, where the ninth interface includes the identifier.

The second application may be the photos application in the embodiments of this application. The eighth interface may be the interface shown in FIG. 10A. The identifier may be the identifier 1004 shown in FIG. 10A. The ninth interface may be the interface shown in FIG. 10B. The identifier may be the identifier 1005 shown in FIG. 10B.

In a possible implementation, after that the second device obtains the first HDR video from the first device, the method further includes: displaying, by the second device, a tenth interface, where the tenth interface includes prompt information indicating that the first HDR video is an HDR10+ video including dynamic metadata, a control for allowing receiving of the first HDR video, and a control for rejecting receiving of the first HDR video; receiving, by the second device, an operation for the control for allowing receiving of the first HDR video; and displaying, by the second device, an eleventh interface in response to the operation for the control for allowing receiving of the first HDR video, where the eleventh interface includes prompt information indicating to display the first HDR video based on the dynamic metadata.

The tenth interface may be the interface shown in FIG. 11B. The prompt information indicating that the first HDR video is the HDR10+ video including the dynamic metadata may be the prompt information 1103 shown in FIG. 11B. The eleventh interface may be the interface shown in FIG. 12. The prompt information indicating to display the first HDR video based on the dynamic metadata may be the prompt information 1201 shown in FIG. 12.

Figure 15:
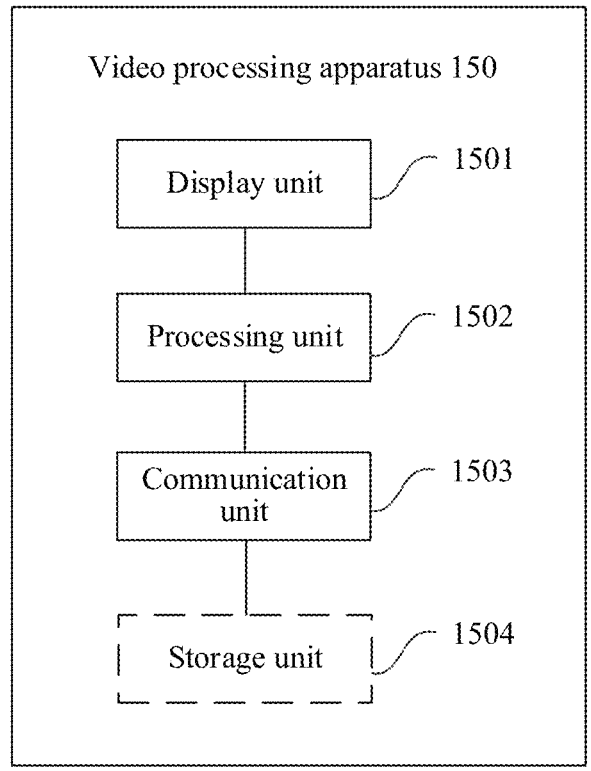
FIG. 15 is a schematic structural diagram of a video processing apparatus according to an embodiment of this application.

The method provided in the embodiments of this application is described above with reference to FIG. 5A, FIG. 5B, FIG. 5C, and FIG. 5D to FIG. 14, and an apparatus for performing the above method provided in the embodiments of this application is described below. Referring to FIG. 15, FIG. 15 is a schematic structural diagram of a video processing apparatus according to an embodiment of this application. The video processing apparatus may be a terminal device in the embodiments of this application, or may be a chip or a chip system in the terminal device. The video processing apparatus may be an apparatus in a first device or an apparatus in a second device.

As shown in FIG. 15, a video processing apparatus 150 is applicable to a communication device, a circuit, a hardware component, or a chip. The video processing apparatus includes a display unit 1501, a processing unit 1502, a communication unit 1503, and the like. The display unit 1501 is configured to support the display step performed in the video processing method. The processing unit 1502 is configured to support the video processing apparatus to perform an information processing step.

The processing unit 1502 may be integrated with the display unit 1501. Communication may occur between the processing unit 1502 and the display unit 1501.

In a possible implementation, the video processing apparatus may further include a storage unit 1504. The storage unit 1504 may include one or more memories, and the memories may be one or more devices or components in a circuit for storing programs or data.

The storage unit 1504 may exist independently, and is connected to the processing unit 1502 by using a communication bus. Alternatively, the storage unit 1504 may be integrated with the processing unit 1502.

For example, the video processing apparatus may be the chip or the chip system of the terminal device in the embodiments of this application. The storage unit 1504 may store computer-executable instructions of the method for the terminal device, so that the processing unit 1502 performs the method for the terminal device in the above embodiments. The storage unit 1504 may be a register, a cache, a random access memory (random access memory, RAM), or the like. The storage unit 1504 may be integrated with the processing unit 1502. The storage unit 1504 may be a read-only memory (read-only memory, ROM) or another type of static storage device that may store static information and instructions. The storage unit 1504 may be independent of the processing unit 1502.

In a possible implementation, the video processing apparatus may further include the communication unit 1503. The communication unit 1503 is configured to support interaction between the video processing apparatus and another device. For example, when the video processing apparatus is the terminal device, the communication unit 1503 may be a communication interface or an interface circuit. When the video processing apparatus is the chip or the chip system in the terminal device, the communication unit 1503 may be a communication interface. For example, the communication interface may be an input/output interface, a pin, or a circuit.

The apparatus in this embodiment may correspondingly be configured to perform the steps in the above method embodiments. Implementation principles and technical effects of the apparatus are similar to those of the method embodiments, and therefore details are not described herein.

Figure 16:
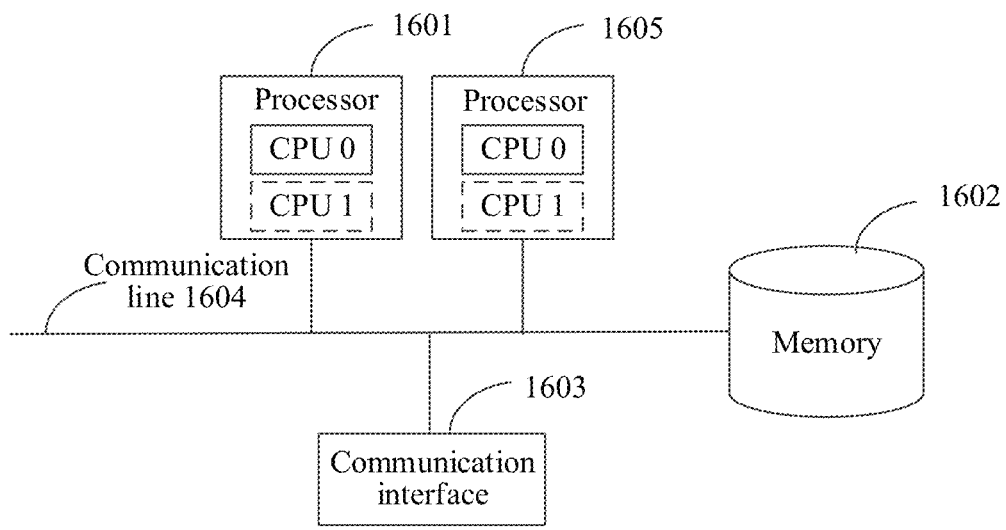
FIG. 16 is a schematic diagram of a hardware structure of another terminal device according to an embodiment of this application.

FIG. 16 is a schematic diagram of a hardware structure of another terminal device according to an embodiment of this application. As shown in FIG. 16, the terminal device may include a processor 1601, a communication line 1604, and at least one communication interface (a communication interface 1603 is used as an example for description in FIG. 16).

The processor 1601 may be a general-purpose central processing unit (central processing unit, CPU), a microprocessor, an application specific integrated circuit (application-specific integrated circuit, ASIC), or one or more integrated circuits configured to control the execution of the processes of the solutions of this application.

The communication line 1604 may include a circuit configured to transmit information between the above components.

The communication interface 1603 is an apparatus of any transceiver type, and is configured to communicate with another device or a communication network, such as the Ethernet or a wireless local area network (wireless local area networks, WLAN).

Possibly, the terminal device may further include a memory 1602.

The memory 1602 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 1604. Alternatively, the memory may be integrated with the processor.

The memory 1602 is configured to store computer-executable instructions for executing the solutions of this application, and the processor 1601 controls execution. The processor 1601 is configured to execute the computer-executable instructions stored in the memory 1602, to implement the method provided in the embodiments of this application.

Possibly, the computer-executable instructions in this embodiment of this application may also be referred to as application code. This is not specifically limited in this embodiment of this application.

During specific implementation, in an embodiment, the processor 1601 may include one or more CPUs, for example, a CPU 0 and a CPU 1 in FIG. 16.

During specific implementation, in an embodiment, the terminal device may include one or more processors, for example, a processor 1601 and a processor 1605 in FIG. 16. Each of these processors may be a single-CPU (single-CPU) processor, or may be a multi-CPU (multi-CPU) processor. The processor herein may be one or more devices, circuits, and/or processing cores configured to process data (for example, a computer program instruction).

Figure 17:
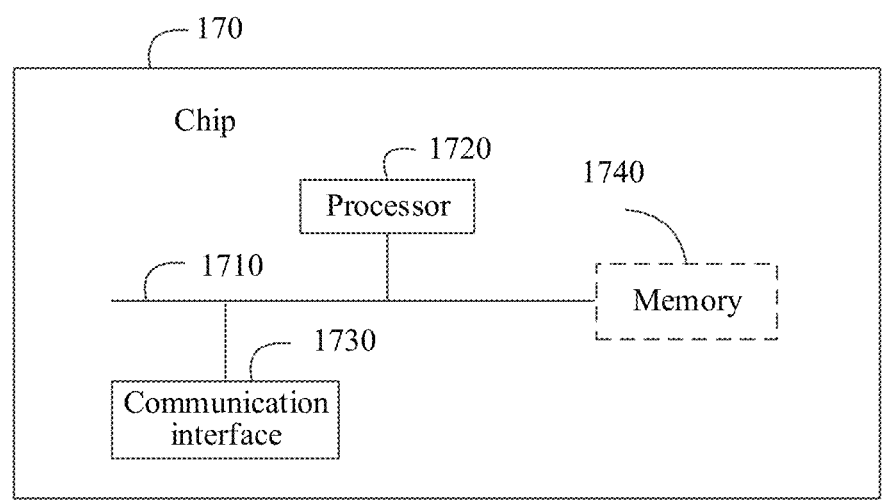
FIG. 17 is a structural schematic diagram of a chip according to an embodiment of this application.

As an example, FIG. 17 is a schematic structural diagram of a chip according to an embodiment of this application. A chip 170 includes one or more than two (including two) processors 1720 and a communication interface 1730.

In some implementations, a memory 1740 stores the following elements: an executable module, a data structure, or a subset thereof, or an extended set thereof.

In this embodiment of this application, the memory 1740 may include a read-only memory and a random access memory, and provide instructions and data to the processor 1720. A part of the memory 1740 may further include a non-volatile random access memory (non-volatile random access memory, NVRAM).

In this embodiment of this application, the memory 1740, the communication interface 1730, and the processor 1720 are coupled together by using a bus system 1710. In addition to a data bus, the bus system 1710 may further include a power bus, a control bus, a status signal bus, and the like. For ease of description, all types of buses in FIG. 17 are marked as the bus system 1710.

The above method described in the embodiments of this application is applicable to the processor 1720 or may be implemented by the processor 1720. The processor 1720 may be an integrated circuit chip and has a signal processing capability. During implementation, each step of the above method may be completed through an integrated logic circuit of hardware in the processor 1720 or an instruction in the form of software. The processor 1720 may be a general-purpose processor (such as a microprocessor or a conventional processor), a digital signal processor (digital signal processor, DSP), an application specific integrated circuit (application specific integrated circuit, ASIC), a field-programmable gate array (field-programmable gate array, FPGA) or another programmable logic device, a discrete gate, a transistor logic device, or a discrete hardware component. The processor 1720 may implement or perform the methods, steps, and logical block diagrams disclosed in the embodiments of the present invention.

Steps of the methods disclosed with reference to the embodiments of this application may be directly performed and completed through a hardware decoding processor, or may be performed and completed through a combination of hardware and software modules in the decoding processor. The software module may be located in a mature storage medium in the art, such as a random access memory, a read-only memory, a programmable read-only memory, or an electrically erasable read-only programmable memory (electrically erasable programmable read only memory, EEPROM). The storage medium is located in the memory 1740. The processor 1720 reads information in the memory 1740, and completes the steps in the above methods in combination with hardware thereof.

In the above embodiments, the instructions stored in the memory for execution by the processor may be implemented in the form of a computer program product. The computer program product may be pre-written in the memory, or may be downloaded and installed in the memory in the form of software.

The computer program product includes one or more computer instructions. When the computer program instructions are loaded and executed on the computer, the processes or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, server, or a data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium that may be stored by the computer, or may be a data storage device, such as a server or a data center, integrating one or more usable media. The usable medium may include a magnetic medium (such as a floppy disk, a hard disk, or a magnetic tape), an optical medium (such as a digital versatile disc (digital versatile disc, DVD)), a semi-conductive medium (such as a solid state disk (solid state disk, SSD)), and the like.

An embodiment of this application further provides a computer-readable storage medium. All or some of the methods in the above embodiments may be implemented by using software, hardware, firmware, or any combination thereof. The computer-readable medium may include a computer storage medium and a communication medium, and may further include any medium that can transmit a computer program from one place to another. The storage medium may be any target medium accessible to a computer.

In a possible design, the computer-readable storage medium may include a compact disc read-only memory (compact disc read-only memory, CD-ROM), a RAM, a ROM, an EEPROM, or another optical disc memory. The computer-readable medium may include a magnetic disk memory or another magnetic disk storage device. Moreover, any connection line may also be appropriately referred to as a computer-readable medium. For example, if software is transmitted from a website, a server, or another remote source by using a coaxial cable, an optical fiber cable, a twisted pair, a DSL or wireless technologies (such as infrared ray, radio, and microwave), the coaxial cable, the optical fiber cable, the twisted pair, the DSL or the wireless technologies such as infrared ray, radio, and microwave are included in the definition of the medium. The magnetic disk and the optical disc used herein include a compact disc (CD), a laser disc, an optical disc, a digital versatile disc (digital versatile disc, DVD), a floppy disk, and a Blu-ray disc. The magnetic disk generally reproduces data in a magnetic manner, and the optical disc reproduces data optically by using a laser.

The above combination should also be included in the scope of the computer-readable medium. The above descriptions are merely specific implementations of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video processing method, applicable to a video processing system, wherein the video processing system comprises a first device and a second device, and the method comprises:
   receiving, by the first device, an operation of enabling photographing in a movie mode, wherein the movie mode is a mode for recording a high dynamic range HDR (HDR) video;
   obtaining, by the first device, a first image sequence based on a camera in response to the operation of enabling photographing, wherein the first image sequence corresponds to a first brightness scene;
   performing, by the first device, encoding based on the first image sequence and first dynamic metadata corresponding to the first brightness scene, to obtain a first HDR video, wherein the first dynamic metadata comprises a preset brightness;
   obtaining, by the second device, the first HDR video from the first device;
   adjusting, by the second device, a brightness of the first HDR video based on the preset brightness, to obtain a second HDR video;
   playing, by the second device, the second HDR video; and
   obtaining, by the first device, a second image sequence based on the camera, wherein the second image sequence corresponds to a second brightness scene, and the first brightness scene is different from the second brightness scene,
   wherein the performing, by the first device, encoding based on the first image sequence and first dynamic metadata corresponding to the first brightness scene, to obtain a first HDR video comprises:
      performing, by the first device, encoding based on the first image sequence, the second image sequence, the first dynamic metadata corresponding to the first brightness scene, and second dynamic metadata corresponding to the second brightness scene, to obtain the first HDR video.

2. The method according to claim 1, wherein the adjusting, by the second device, a brightness of the first HDR video based on the preset brightness, to obtain a second HDR video comprises:
   determining, by the second device, a brightness ratio, wherein the brightness ratio is a ratio between a peak brightness of the second device and the preset brightness; and
   adjusting, by the second device, the brightness of the first HDR video based on the brightness ratio, to obtain the second HDR video.

3. The method according to claim 1, wherein before the performing, by the first device, encoding based on the first image sequence and first dynamic metadata corresponding to the first brightness scene, to obtain a first HDR video, the method further comprises:
   performing, by the first device, image preprocessing on the first image sequence, to obtain a first image sequence after the image preprocessing;
   performing, by the first device, gamma correction processing on the first image sequence after the image preprocessing, to obtain a first image sequence after the gamma correction processing;
   performing, by the first device, 3D lookup table processing on the first image sequence after the gamma correction processing, to obtain a first image sequence after the 3D lookup table processing, wherein the first image sequence after the 3D lookup table processing comprises first static metadata corresponding to the first image sequence; and
   the performing, by the first device, encoding based on the first image sequence and first dynamic metadata corresponding to the first brightness scene, to obtain a first HDR video comprises: performing, by the first device, encoding based on the first image sequence after the 3D lookup table processing and the first dynamic metadata corresponding to the first brightness scene, to obtain the first HDR video.

4. The method according to claim 3, wherein the first HDR video comprises the first static metadata and the first dynamic metadata.

5. The method according to claim 4, further comprising:
decoding, by the second device, the second HDR video into the first image sequence and the first static metadata when it is determined that the second device supports processing of the first static metadata; and
performing, by the second device, encoding based on the first image sequence and the first static metadata, to obtain a third HDR video, wherein the second HDR video is different from the third HDR video.

6. The method according to claim 5, wherein a type of the first HDR video is an HDR10+ video, a type of the second HDR video is the HDR10+ video, and a type of the third HDR video is an HDR10 video.

7. The method according to claim 1, wherein the receiving, by the first device, an operation of enabling photographing in a movie mode comprises:
receiving, by the first device, an operation of enabling the movie mode;
displaying, by the first device, a first interface in response to the operation of enabling the movie mode, wherein the first interface comprises a control for recording the HDR video and a control for enabling photographing;
receiving, by the first device, an operation of enabling the control for recording the HDR video when the control for recording the HDR video is in a disabled state;
displaying, by the first device, a second interface in response to the operation for the control for recording the HDR video, wherein the second interface comprises prompt information indicating that a 4K HDR10+ mode is enabled; and
receiving, by the first device, an operation for the control for enabling photographing when the control for recording the HDR video is in an enabled state.

8. The method according to claim 7, further comprising:
receiving, by the first device, an operation of disabling the control for recording the HDR video when the control for recording the HDR video is in the enabled state; and
displaying, by the first device, a third interface in response to the operation for the control for recording the HDR video, wherein the third interface comprises prompt information indicating that the 4K HDR10+ mode is disabled.

9. The method according to claim 7, further comprising:
receiving, by the first device, an operation of enabling the movie mode for a first time; and
displaying, by the first device, a fourth interface in response to the operation of enabling the movie mode for the first time, wherein the fourth interface comprises the control for recording the HDR video and prompt information indicating that a 4K HDR10+ video is recorded after the control for recording the HDR video is enabled.

10. The method according to claim 7, wherein the receiving, by the first device, an operation of enabling photographing in a movie mode comprises:
receiving, by the first device, an operation of enabling the movie mode;
displaying, by the first device, a fifth interface in response to the operation of enabling the movie mode, wherein the fifth interface comprises a control for viewing settings corresponding to a first application and a control for enabling photographing;
receiving, by the first device, an operation for the control for viewing settings corresponding to the first application;
displaying, by the first device, a sixth interface in response to the operation for the control for viewing the settings corresponding to the first application, wherein the sixth interface comprises a first control for recording a video with a 10-bit HDR in the movie mode and switching the video to 4K; and
receiving, by the first device, the operation for the control for enabling photographing when the first control is in an enabled state.

11. The method according to claim 7, further comprising:
receiving, by the first device, an operation for a control for viewing function details in the first application; and
displaying, by the first device, a seventh interface in response to the operation for the control for viewing the function details in the first application, wherein the seventh interface comprises function details corresponding to the movie mode, and the function details corresponding to the movie mode indicate that a 4K HDR10+ video is allowed to be recorded in the movie mode.

12. The method according to claim 7, further comprising:
receiving, by the first device, an operation of enabling a second application;
displaying, by the first device, an eighth interface in response to the operation of enabling the second application, wherein the eighth interface comprises the first HDR video and an identifier corresponding to the first HDR video, and the identifier indicates a type of the first HDR video;
receiving, by the first device, an operation for the first HDR video; and
displaying, by the first device, a ninth interface in response to the operation for the first HDR video, wherein the ninth interface comprises the identifier.

13. The method according to claim 1, wherein after the obtaining, by the second device, the first HDR video from the first device, the method further comprises:
displaying, by the second device, a tenth interface, wherein the tenth interface comprises prompt information indicating that the first HDR video is an HDR10+ video comprising dynamic metadata, a control for allowing receiving of the first HDR video, and a control for rejecting receiving of the first HDR video;
receiving, by the second device, an operation for the control for allowing receiving of the first HDR video; and
displaying, by the second device, an eleventh interface in response to the operation for the control for allowing receiving of the first HDR video, wherein the eleventh interface comprises prompt information indicating to display the first HDR video based on the dynamic metadata.

14. A video processing method, applicable to a first device, the method comprising:
receiving, by the first device, an operation of enabling photographing in a movie mode, wherein the movie mode is a mode for recording a high dynamic range HDR (HDR) video;
obtaining, by the first device, a first image sequence based on a camera in response to the operation of enabling photographing, wherein the first image sequence corresponds to a first brightness scene;
performing, by the first device, encoding based on the first image sequence and first dynamic metadata corresponding to the first brightness scene, to obtain a first HDR video, wherein the first dynamic metadata comprises a preset brightness;
sending, by the first device, the first HDR video to a second device;
obtaining, by the first device, a second image sequence based on the camera, wherein the second image sequence corresponds to a second brightness scene, and the first brightness scene is different from the second brightness scene,
wherein the performing, by the first device, encoding based on the first image sequence and first dynamic metadata corresponding to the first brightness scene, to obtain a first HDR video comprises:
performing, by the first device, encoding based on the first image sequence, the second image sequence, the first dynamic metadata corresponding to the first brightness scene, and second dynamic metadata corresponding to the second brightness scene, to obtain the first HDR video.

15. The method according to claim 14, wherein before the performing, by the first device, encoding based on the first image sequence and first dynamic metadata corresponding to the first brightness scene, to obtain a first HDR video, the method further comprises:
performing, by the first device, image preprocessing on the first image sequence, to obtain a first image sequence after the image preprocessing;
performing, by the first device, gamma correction processing on the first image sequence after the image preprocessing, to obtain a first image sequence after the gamma correction processing; and
performing, by the first device, 3D lookup table processing on the first image sequence after the gamma correction processing, to obtain a first image sequence after the 3D lookup table processing, wherein the first image sequence after the 3D lookup table processing comprises first static metadata corresponding to the first image sequence,
wherein the performing, by the first device, encoding based on the first image sequence and first dynamic metadata corresponding to the first brightness scene, to obtain a first HDR video comprises: performing, by the first device, encoding based on the first image sequence after the 3D lookup table processing and the first dynamic metadata corresponding to the first brightness scene, to obtain the first HDR video.

16. The method according to claim 15, wherein the first HDR video comprises the first static metadata and the first dynamic metadata.

17. A terminal device, comprising a memory, a processor, and a computer program stored in the memory, wherein the processor, when executing the computer program, causes the terminal device to perform a method, the method comprising:
receiving an operation of enabling photographing in a movie mode, wherein the movie mode is a mode for recording a high dynamic range HDR (HDR) video;
obtaining a first image sequence based on a camera in response to the operation of enabling photographing, wherein the first image sequence corresponds to a first brightness scene;
performing encoding based on the first image sequence and first dynamic metadata corresponding to the first brightness scene, to obtain a first HDR video, wherein the first dynamic metadata comprises a preset brightness;
sending the first HDR video to a second device; and
obtaining a second image sequence based on the camera, wherein the second image sequence corresponds to a second brightness scene, and the first brightness scene is different from the second brightness scene,
wherein the performing encoding based on the first image sequence and first dynamic metadata corresponding to the first brightness scene, to obtain a first HDR video comprises:
performing encoding based on the first image sequence, the second image sequence, the first dynamic metadata corresponding to the first brightness scene, and second dynamic metadata corresponding to the second brightness scene, to obtain the first HDR video.

18. The terminal device according to claim 17, wherein before performing encoding based on the first image sequence and first dynamic metadata corresponding to the first brightness scene, the method further comprises:
performing image preprocessing on the first image sequence, to obtain a first image sequence after the image preprocessing;
performing gamma correction processing on the first image sequence after the image preprocessing, to obtain a first image sequence after the gamma correction processing; and
performing 3D lookup table processing on the first image sequence after the gamma correction processing, to obtain a first image sequence after the 3D lookup table processing, wherein the first image sequence after the 3D lookup table processing comprises first static metadata corresponding to the first image sequence,
wherein the performing encoding based on the first image sequence and first dynamic metadata corresponding to the first brightness scene, to obtain a first HDR video comprises: performing encoding based on the first image sequence after the 3D lookup table processing and the first dynamic metadata corresponding to the first brightness scene, to obtain the first HDR video.

19. The terminal device according to claim 17, wherein the first HDR video comprises the first static metadata and the first dynamic metadata.

* * * * *